(12) United States Patent
Strobel et al.

(10) Patent No.: US 10,790,875 B2
(45) Date of Patent: Sep. 29, 2020

(54) LOW POWER MODES FOR DATA TRANSMISSION FROM A DISTRIBUTION POINT

(71) Applicant: Lantiq Beteiligungs-GmbH & Co. KG, Neubiberg (DE)

(72) Inventors: Rainer Strobel, Munich (DE); Lilia Smaoui, Munich (DE); Vladimir Oksman, Morganville, NJ (US)

(73) Assignee: Lantiq Beteillgungs-GmbH & CO. KG, Neubiberg (DE)

( * ) Notice: Subject to any disclaimer, the term of this patent is extended or adjusted under 35 U.S.C. 154(b) by 0 days.

(21) Appl. No.: 15/981,173

(22) Filed: May 16, 2018

(65) Prior Publication Data

US 2018/0262234 A1   Sep. 13, 2018

Related U.S. Application Data

(63) Continuation of application No. 14/888,713, filed as application No. PCT/EP2014/059134 on May 5, 2014, now Pat. No. 10,003,381.

(60) Provisional application No. 61/819,579, filed on May 5, 2013, provisional application No. 61/819,580, filed on May 5, 2013.

(51) Int. Cl.

| H04B 3/32 | (2006.01) |
|---|---|
| H04W 76/28 | (2018.01) |
| H04M 11/06 | (2006.01) |
| H04L 5/14 | (2006.01) |
| H04W 72/04 | (2009.01) |

(52) U.S. Cl.
CPC .............. *H04B 3/32* (2013.01); *H04L 5/14* (2013.01); *H04M 11/062* (2013.01); *H04W 72/0446* (2013.01); *H04W 76/28* (2018.02); *H05K 999/99* (2013.01); *Y02D 30/34* (2018.01); *Y02D 50/44* (2018.01)

(58) Field of Classification Search
CPC ............ H04W 76/28; H04W 72/0446; H04W 76/048; H04B 3/32; H04L 5/14; H04M 11/062; H05K 999/99; Y02D 30/34
See application file for complete search history.

(56) References Cited

U.S. PATENT DOCUMENTS

| 5,495,483 A | 2/1996 | Grube et al. |
|---|---|---|
| 5,521,906 A | 5/1996 | Grube et al. |
| 8,295,151 B2 | 10/2012 | Dortschy et al. |

(Continued)

FOREIGN PATENT DOCUMENTS

| CN | 1805421 A | 7/2006 |
|---|---|---|
| CN | 1889551 A | 1/2007 |

(Continued)

OTHER PUBLICATIONS

G .993.5 Series G: Transmission Systems and Media,Digital Systems and Networks, Apr. 2010, pp. 1-80.*

(Continued)

*Primary Examiner* — Sophia Vlahos
(74) *Attorney, Agent, or Firm* — 2SPL Patent Attorneys PartG mbB

(57) ABSTRACT

Methods and devices are discussed where a common bit loading table is constructed from minimum gain from a plurality of bit loading tables for different combinations of lines being in a transmit or quiet mode.

34 Claims, 17 Drawing Sheets

(56) References Cited

U.S. PATENT DOCUMENTS

| | | | |
|---|---|---|---|
| 8,306,097 B2 * | 11/2012 | De Lind Van Wijngaarden | H04B 3/46 375/222 |
| 8,498,294 B1 | 7/2013 | Monk et al. | |
| 8,824,265 B2 | 9/2014 | Maes et al. | |
| 8,854,943 B2 | 10/2014 | Goodson et al. | |
| 9,048,925 B2 | 6/2015 | Zirwas | |
| 9,356,654 B2 | 5/2016 | Starr et al. | |
| 9,503,185 B2 | 11/2016 | Joffe et al. | |
| 2003/0063564 A1 | 4/2003 | Ha | |
| 2004/0095921 A1 * | 5/2004 | Kerpez | H04B 3/32 370/351 |
| 2004/0171359 A1 | 9/2004 | Tirkkonen et al. | |
| 2005/0003794 A1 * | 1/2005 | Liu | H04W 52/0216 455/355 |
| 2005/0114904 A1 | 5/2005 | Monk et al. | |
| 2005/0271129 A1 | 12/2005 | Reina | |
| 2006/0046658 A1 * | 3/2006 | Cruz | H04W 28/22 455/67.11 |
| 2007/0002599 A1 * | 1/2007 | Caven | H05K 1/181 363/144 |
| 2008/0069193 A1 | 3/2008 | Shridhar et al. | |
| 2008/0123725 A1 | 5/2008 | J | |
| 2008/0298444 A1 * | 12/2008 | Cioffi | H04L 43/106 375/222 |
| 2009/0193109 A1 * | 7/2009 | Kuo | G06F 1/3209 709/223 |
| 2009/0296864 A1 | 12/2009 | Lindoff | |
| 2010/0043031 A1 | 2/2010 | Wang | |
| 2010/0278328 A1 | 11/2010 | Mahadevan et al. | |
| 2010/0312552 A1 | 12/2010 | Zheng | |
| 2011/0142111 A1 * | 6/2011 | Sands | H04M 11/062 375/222 |
| 2012/0008525 A1 | 1/2012 | Koskinen | |
| 2012/0026926 A1 | 2/2012 | Frenzel et al. | |
| 2012/0039373 A1 | 2/2012 | Cuzzola et al. | |
| 2012/0182886 A1 | 7/2012 | Ong | |
| 2012/0250491 A1 | 10/2012 | Goodson | |
| 2012/0287979 A1 | 11/2012 | Garrett et al. | |
| 2012/0324262 A1 * | 12/2012 | Chang | H04L 5/0053 713/320 |
| 2013/0028202 A1 | 1/2013 | Hofmann | |
| 2013/0208587 A1 | 8/2013 | Bala | |
| 2016/0072532 A1 | 3/2016 | Ginis et al. | |
| 2016/0073448 A1 | 3/2016 | Strobel et al. | |
| 2016/0087677 A1 | 3/2016 | Strobel et al. | |

FOREIGN PATENT DOCUMENTS

| | | |
|---|---|---|
| EP | 2391031 A1 | 11/2011 |
| WO | 2012/076598 A1 | 6/2012 |
| WO | 2012/102917 A1 | 8/2012 |

OTHER PUBLICATIONS

Non Final Office Action dated May 9, 2017 in connection with U.S. Appl. No. 14/888,714.

Associate Rapporteur for G.fast: "G.fast: Updated Issues List for G.fast; TD2013-03-Q4-U20R1", ITU-T Draft; Study Period 2013-2016, International Telecommunication Union, Geneva; CH, vol. 4/15, Mar. 22, 2013, pp. 1-42, XP017580426.

Adtran, Inc: "G.fast: Extension of STDMA and STDD", ITU-T Draft; Study Period 2009-2012, International Telecommunication Union, Geneva; CH, vol. 4/15, Feb. 22, 2012, pp. 1-9, XP017579706.

International Search Report and Written Opinion of PCT/EP2014/059135.

International Search Report and Written Opinion of PCT/EP2014/059134.

Associate Rapporteur for G.fast: "G.fast: Updated Issues List for G.fast; TD2013-05-Q4-U20", ITU-T Draft; Study Period 2013-2016, International Telecommunication Union, Geneva; CH, vol. 4/15, Apr. 11, 2013, pp. 1-42. XP01758044.

Notice of Allowance dated Dec. 5, 2017 in connection with U.S. Appl. No. 14/888,714.

Ex Parte Quayle Office Action dated Apr. 14, 2017 for U.S. Appl. No. 14/888,713.

Non-Final Office Action dated Aug. 2, 20166 for U.S. Appl. No. 14/888,713.

Notice of Allowance dated Feb. 22, 2018 for U.S. Appl. No. 14/888,713.

U.S. Appl. No. 15/902,638, filed Feb. 22, 2018.

Non Final Office Action dated May 9, 2019 in connection with U.S. Appl. No. 15/902,638.

Non Final Office Action dated May 9, 2019 in connection with U.S. Appl. No. 16/131,488.

Final Office Action dated Oct. 1, 2019 in connection with U.S. Appl. No. 15/902,638.

Final Office Action dated Oct. 1, 2019 in connection with U.S. Appl. No. 16/131,488.

Notice of Allowance dated Dec. 13, 2019 in connection with U.S. Appl. No. 16/131,488.

Extended European Search Report dated Sep. 30, 2019 for European Application 19189805.5.

"G.fast: Updated Issues List for G.fast," Source: Associate Rapporteur for G.fast. ITU-Telecommunication Standardization Sector. Study Group 15. Hoffman Estates, Illinois May 13-17, 2013. Question: 4/15. Temporary Document 2013-05-Q4-U20. 42 pages.

"G.fast: Extension of STDMA and STDD." Source: ADTRAN Inc. ITU-Telecommunication Standarization Sector. Study Group 15. Paris, France, Feb. 27-Mar. 3, 2012, Question: 4/15. 2012-02-4A-061. 9 pages.

* cited by examiner

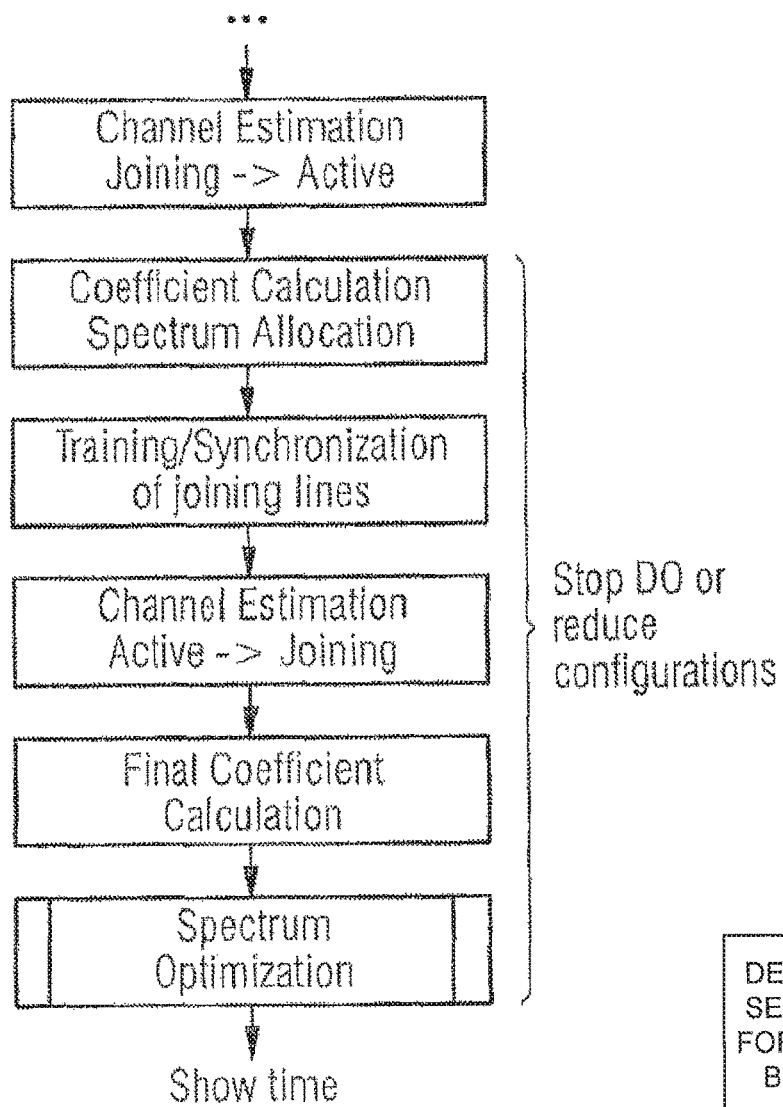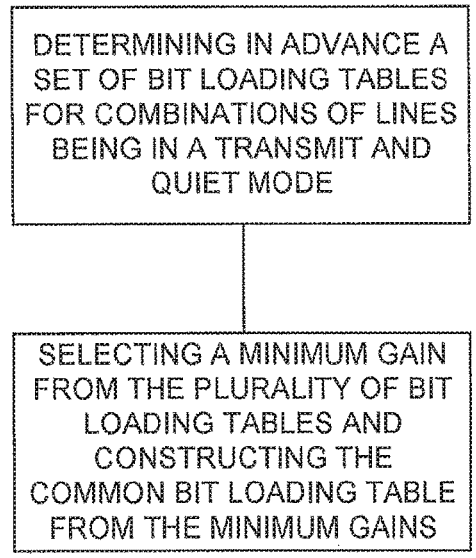

LOW POWER MODES FOR DATA TRANSMISSION FROM A DISTRIBUTION POINT

REFERENCE TO RELATED APPLICATION

This application is a continuation of U.S. application Ser. No. 14/888,713, which is a national stage entry of PCT/EP2014/059134 having an international application date of May 5, 2014, which application claims priority of U.S. Application Ser. No. 61/819,579, filed May 5, 2013, entitled, "Low Power Modes for Data Transmission From a Distribution Point" and U.S. Application Ser. No. 61/819,580 filed May 5, 2013, entitled, "Timesharing for Low Power Modes". The entire disclosure of the prior applications is considered part of the disclosure of this application and is hereby incorporated by reference.

FIELD

The present application relates to low power modes for data transmission from a distribution point.

BACKGROUND

Recent trends in the access communications market show that data rates up to 100 Mb/s which are provided by VDSL systems using Vectoring as defined in ITU-T Recommendation G.993.5 are not sufficient for all applications and bit rates up to 1.0 Gb/s are required in some cases. To achieve these targets, for wire-based implementations currently copper pairs connecting the CPE must be as short as 50-100 m. Operation using so short loops requires installation of many small street/MDU (Multi Dwelling Unit) cabinets called Distribution Points (DP) that serve a very small number of customers, e.g. 16 or 24 and are connected to the backbone via fiber (fiber to the distribution point FTTdp).

Vectoring is used in systems operating from a DP [GC02], to reduce far-end crosstalk (FEXT), which is absolutely necessary to obtain high bit rates. To improve energy efficiency and to reduce hardware complexity, synchronized time division duplexing (S-TDD) is used for FTTdp instead of frequency division duplexing (FDD) which is used in VDSL.

DPs shall allow very flexible installation practices: they should be light and easy to install on a pole or house wall, or basement, without air-conditioning. The most challenging issue for these flexible connection plans is providing DPs with power. The only solution found is so-called "reverse feeding" when the equipment of the DP is fed by the connected customer. The requirement of reverse power feeding and the small size of the DP implies substantial restrictions on the power consumption of the DP, which main contributors are DSL transceivers. Further, the customer unit is often required battery-powered operation (to support life line POTS during power outages). The latter applies low power requirements also to DSL transceivers of the CP equipment.

Conventional DSL systems transmit data continuously on all lines sharing a cable binder. Whenever there is no data available, idle bytes are transmitted. With this type of static operation, the system stability and performance is maintained.

In current DSL systems (e.g., ADSL), low-power modes and data rate adaptation use a method that reduces bit loading and TX (Transmit) power on the line when data traffic turns to be slow and reconstructs it back when high speed traffic is back. Other proposed methods use called SRA (Seamless Rate Adaptation) to reconfigure the bit rate and TX power of the links. Both reconfiguration methods are too slow to perform adaptive link reconfiguration with respect to the actual traffic requirements of the subscribers.

Also in terms of power saving, current DSL transceivers only allow power saving by transmit power reduction. The transmit power in VDSL systems is in the range of 14 dBm to 20 dBm and therefore, the transmit power largely contributes to the overall power consumption.

However in FTTdp applications, the transmit power is only a small portion of the overall power consumption, because the aggregate transmit power is in the range of 4 dBm. Components like the analog and digital frontend electronics consume power irrespective of the transmit power, but these components significantly contribute to the overall power consumption, because they operate at much higher frequencies of 100 MHz or 200 MHz in comparison to 8 MHz-30 MHz in VDSL.

Therefore, to provide significant power savings also analog and digital components of the transceiver, such as analog front end (AFE) and digital front end (DFE), need to be switched into low-power (standby) state. This operation mode is called Discontinuous Operation.

In currently operated systems using Vectoring, such as ITU G.993.5, a time consuming procedure called "orderly leaving" is required before a link can be switched off. If a line is disconnected without orderly leaving, the remaining active lines of the binder experience substantial performance drops. Therefore, AFE and DFE cannot be turned off for short time which substantially reduces power savings.

Therefore, improvements in using low power modes like discontinuous operations together with vectoring would be desirable.

BRIEF DESCRIPTION OF THE DRAWINGS

FIG. 6A illustrates the final step of a line joining sequence.

FIG. 6B illustrates a method for providing a common bit loading table for multiple customer premises equipment (CPEs) in a network using discontinuous operation for transmitting data in a vector crosstalk cancellation environment.

DETAILED DESCRIPTION

Embodiments will be described in the following in detail with reference to the attached drawings. It should be noted that these embodiments serve as illustrative examples only and are not to be construed as limiting. For example, while embodiments may be described having numerous details, features or elements, in other embodiments some of these details, features or elements may be omitted and/or may be replaced by alternative features or elements. In other embodiments, additionally or alternatively further features, details or elements apart from the ones explicitly described may be provided.

Communication connections discussed in the following may be direct connections or indirect connections, i.e. connections with or without additional intervening elements, as long as the general function of the connection, for example to transmit a certain kind of signal, is preserved. Connections may be wireless connections or wire-based connections unless noted otherwise.

In some embodiments, a low power mode using discontinuous operation is provided.

In some embodiments, the discontinuous operation is used in a vectored system. In some embodiments, mechanisms for joining of lines to a vectored group may be provided.

Figure 1:
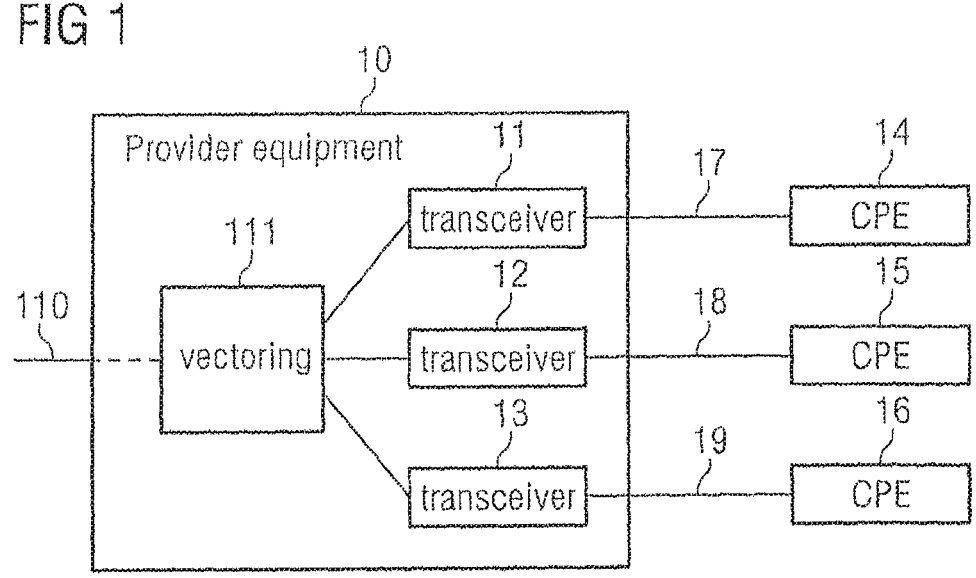
FIG. 1 is a block diagram illustrating a communication system according to an embodiment.

Turning now to the figures, in FIG. 1 a communication system according to an embodiment is shown. The system of FIG. 1 comprises a provider equipment 10 communicating with a plurality of CPE units 14-16. While three CPE units 14-16 are shown in FIG. 1, this serves merely as an example, and any number of CPE units may be provided. Provider equipment 10 may be central office equipment, equipment in a distribution point (DP), or any other equipment used on a provider side. In case provider equipment 10 is part of a distribution point, it may for example receive and send data from and to a network via a fiber optic connection 110. In other embodiments, other kinds of connections may be used.

In the embodiment of FIG. 1, provider equipment 10 comprises a plurality of transceivers 11-13 to communicate with CPE units 14-16 via respective communication connections 17-19. Communication connections 17-19 may for example be copper lines, e.g. twisted pairs of copper lines. Communication via communication connections 17-19 may be a communication based on a multicarrier modulation like discrete multitone modulation (DMT) and/or orthogonal frequency division multiplexing (OFDM), for example a xDSL communication like ADSL, VDSL, VDSL2, G.fast etc., i.e. a communication where data is modulated on a plurality of carriers, also referred to as tones. In some embodiments, the communication system may use vectoring, as indicated by a block 111 in FIG. 1. Vectoring comprises joint processing of signals to be sent and/or received to reduce crosstalk.

A communication direction from provider equipment 10 to CPE units 14-16 will also be referred to as downstream direction, and a communication direction from CPE units 14-16 will be also be referred to as upstream direction. Vectoring in the downstream direction is also referred to as crosstalk precompensation, whereas vectoring in the upstream direction is also referred to as crosstalk cancellation or equalization.

Provider equipment 10 and/or CPE units 14-16 may include further communication circuits (not shown) conventionally employed in communication systems, for example circuitry for modulating, bit loading, Fourier transformation etc.

In some embodiments, communication via communication connections 17-19 is a frame-based communication. A plurality of frames may form a superframe.

In some embodiments, discontinuous operation is employed. However, a conventional application of discontinuous operation as discussed further below to reduce power consumption may include some unsolved problems in some implementations.

A problem in conventional approaches is that if no precoder (downstream) and equalizer (upstream) coefficient recalculation is performed, the SNR in discontinuous operation drops. With coefficient recalculation, the transmit power (downstream) is increased and may violate the limit. In upstream, the noise power is increased and causes a change of the SNR. In this respect, precoder and equalizer refer to elements used in vectoring (crosstalk reduction through joint processing), the precoder for vectoring in the downstream direction and the equalizer for vectoring in the upstream direction. The coefficients mentioned above are coefficients employed in the precoder or equalizer, respectively. Further information regarding these issues will be given further below.

A working solution in some embodiments requires that no errors or substantial noise margin drop occur as well as transmit power spectral density (PSD) are maintained to guarantee stable operation in every particular configuration of active or discontinued lines in a given deployment, so that no violation in PSD; power, bit loading or SNR occur in any configuration.

The problem can be solved by finding a single configuration of transmit powers and bit loadings that takes into account the transmit power variants and SNR variations of discontinuous operation but does not violate the constraints for any configuration.

The methods used to find this configuration in an optimized way require specific information from the CPE side to be communicated the DP, which performs the optimization.

The invention shows how to find this configuration and how to incorporate the corresponding operations into system initialization and line joining process.

The invention provides method of selection this configuration that result in minimum performance degradation.

To maintain stability of the system operating in low power mode and satisfy the spectral mask constraints, some embodiments include searching a minimum configuration (of transmit PSD and bit loading) which works for all cases of active or discontinued lines.

To find this stable configuration, we define a set of active lines $1_a \subseteq \{1 \ldots L\}$ which is a subset of all lines. Furthermore, we define a set of all configurations $T=\{1_{a\ 1}, \ldots, 1_{a\ t}, \ldots, 1_{a\ T}\}$ which contains all possible sets of active lines $1_{a\ 1} \ldots 1_{a\ T}$ of all available configurations $t=1 \ldots T$.

For a system with L lines, there are $2^L$ possible configurations, which means that the cardinality of the set of configurations T is $|T|=2^L$ which might be a very high number. Some embodiments offer methods to reduce the associated computation complexity.

In downstream direction, a scale matrix $S_{min}$ is searched, which is a single scaling matrix that satisfies the transmit power constraints for all possible configurations. The scale matrix $S_t$ for configuration $t \in T$ satisfies Eq. (1.13) for the precoder matrix as given by Eq. (1.6).

The transmit power which satisfies the transmit power constraint for all cases is then given by $$s_{min\ ii} = \min_{t=1 \ldots T} s_{ii\ t} \quad (3.1)$$

where $s_{ii\ t}$ is the scale factor satisfying Eq. (1.14) or (1.20) for the corresponding subset of active lines $1_{a\ t}$.

Figure 2:
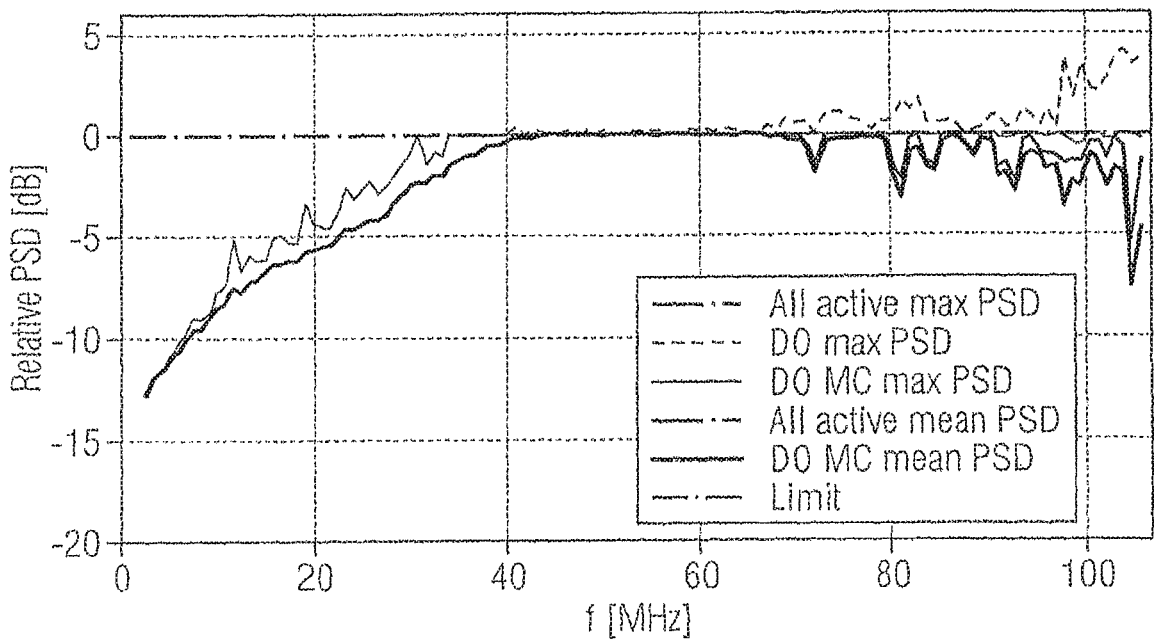
FIG. 2 illustrates minimum transmit power spectral densities (PSDs) satisfying a spectral mask constraint for all configurations.

FIG. 2 shows mean and maximum PSDs for the lines from an example of Tab. 1.1 (found further below) for different cases.

In embodiments, the maximum PSD is calculated according to $$\max PSD = \max_{t \in T} \left( \max_{l \in 1_{at}} c_{txllt} \right)$$

from the precoder output transmit covariance matrix according to Eq. (1.12).

The mean PSD is given by mean $$PSD = \frac{1}{|1_a|} \left( \sum_{l \in 1_a} c_{txll} \right).$$

Simulation results for 10 lines of 100 m length each, with all possible configurations searched through are shown in FIG. 2.

The maximum PSD without discontinuous operation matches the limit PSD, as shown by the light blue line.

The red line shows that if coefficient recalculation is applied without any further PSD correction, the transmit PSD will violate the limit PSD.

The light green line shows the maximum PSD of the minimum configuration. It is below the limit, but still very close to the limit.

The mean PSDs of the minimum configuration compared to the mean PSD without discontinuous operation show that the additional PSD reduction required for the minimum configuration is close to zero for lower frequencies and is up to 2 dB at higher frequencies.

Figure 3:
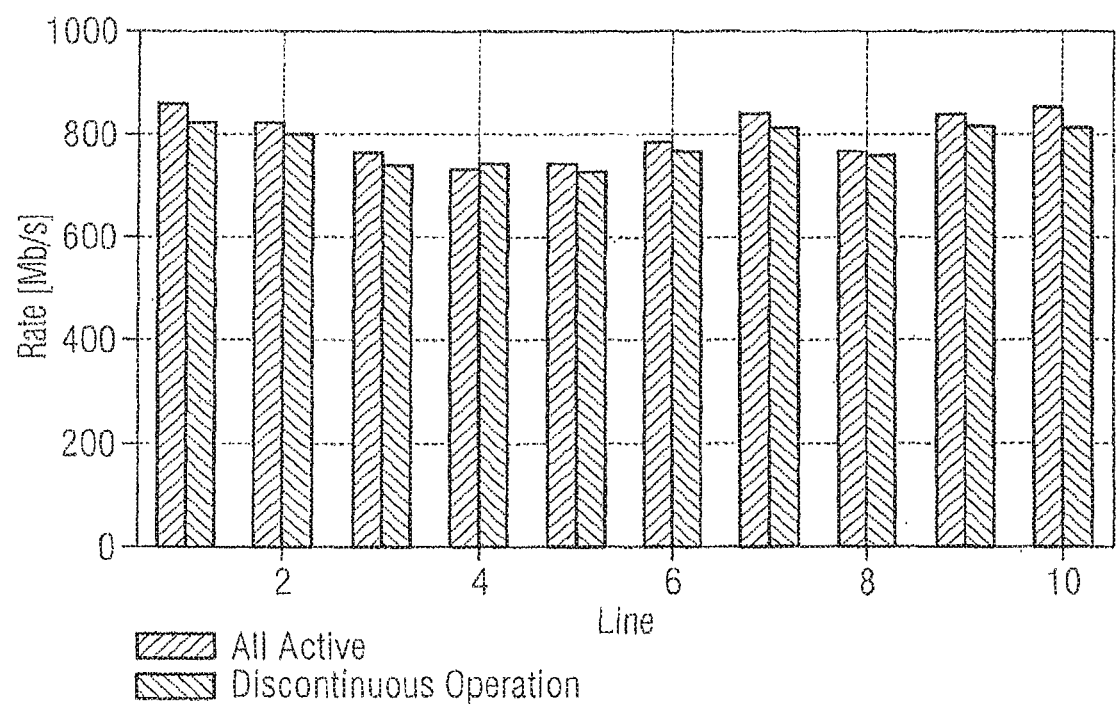
FIG. 3 illustrates a comparison between peak rates with and without discontinuous operation with bit loading and PSD downscaling.

As a result of PSD reduction at higher frequencies, the minimum configuration results in a performance degradation compared to the case without discontinuous operation. For the given example of 10 lines the data rate reduction caused by spectrum minimization is shown in FIG. 3.

With the aim to select the minimum configuration, the DP needs also to compute the required bit loading associated with minimum configuration. For this, a feedback from the CPE of each line is required to deliver sensitive information, such as measured SNR or channel-related parameters, such as FEQ coefficients or obtained FFT samples. Those parameters are obtained by the joining line during initialization, as described further below in more detail.

In uplink (upstream) direction, a similar problem may occur because there, the coefficient recalculation according to Eq. (1.10) results in a change of the receiver noise covariance which causes a change of the signal-to-noise ratio SNR.

The transmitted bits $b_l$ on a particular subcarrier of line l depend on the SNR according to Eq.:

$$b_l = \left\lfloor \log_2\left(1 + \frac{SNR}{\Gamma}\right) \right\rfloor. \quad (3.2)$$

Therefore, the bit loading in uplink direction must be selected with respect to the worst case SNR $$b_{l\ min} = \min_{t=1 \ldots T} b_{l\ t}. \quad (3.3)$$

Figure 4:
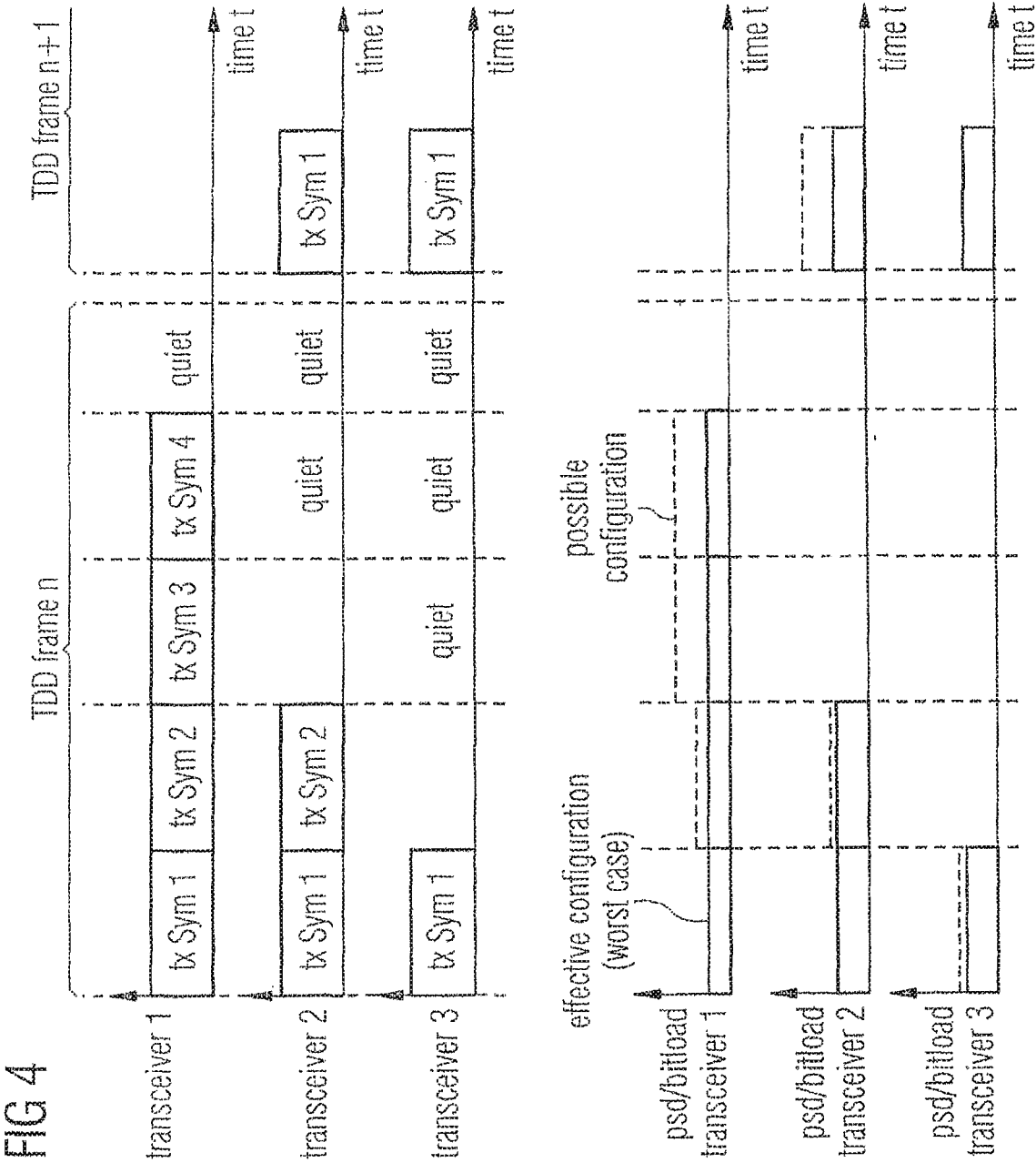
FIG. 4 illustrates an example for twotime division duplex (TDD) frames with discontinuous operation.

FIG. 4 shows an example of a transmission frame (TDD frame) of a system applying discontinuous operation with minimum PSD and bit loading.

It must be noted that in some embodiments, the PSD and bit loading satisfying the constraints for a single configuration may be higher than the bit loading and PSD of the case of all lines active.

In some cases, the minimum configuration which consists of the minimum gain factors (Eq. (3.1)) in downstream and the minimum bit loading (Eq. (3.3)) in upstream is dominated by a single configuration which significantly reduces the overall performance, also referred to as critical configuration.

In cases where the search of the minimum configuration indicates a critical configuration, some embodiments avoid this configuration. Such critical configurations are excluded form the set T of the available configurations. The set of critical configurations is stored.

If the critical configuration of enabled and disabled lines occurs during data transmission, the corresponding lines are not switched off, but they transmit idle symbols, instead, to avoid that the corresponding analog and digital front-ends are discontinued. The idle symbols may be transmitted with zero power to reduce power consumption during idle symbol transmission.

Next, some simulation results for a non-limiting example system will be discussed. The example system consists of 10 lines with 100 m length each. The target rates are set to 800 Mbit/s for lines 1 and 2, 100 Mbit/s for lines 3 to 6 and 500 Mbit/s for lines 7 to 10. FIG. 3.4 shows the scheduling for a TDD frame with 40 DMT symbols. The average on-time of the links to achieve this data rates is 50%. One of the lines uses almost the complete TDD frame because it is close to its peak data rate. The data rates of the links are constant over the frame, because the same bit loading is used for all symbols.

Figure 5:
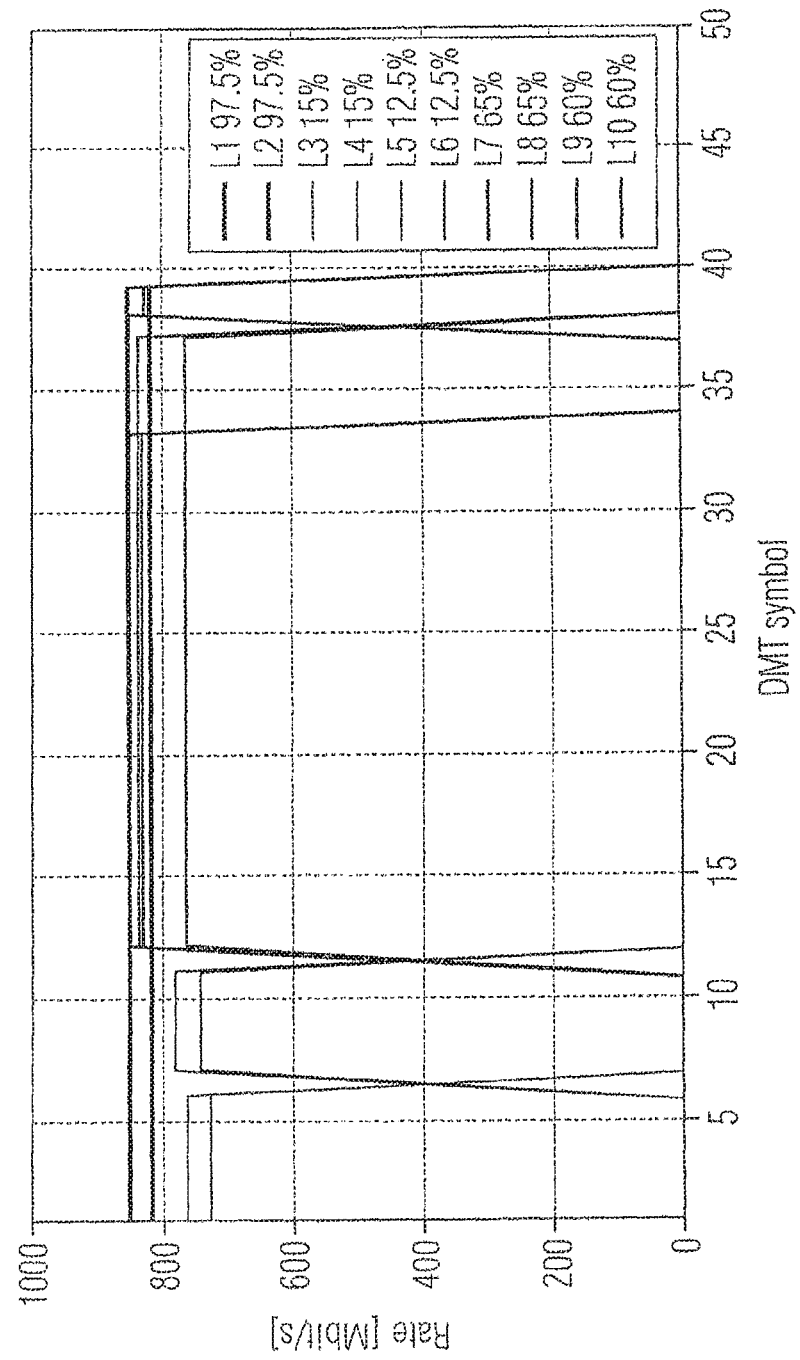
FIG. 5 illustrates simulation results for an example system showing assignment of data rates within a TDD frame for a minimum configuration, where an overall on-time is 50%.

In FIG. 5 the symbols of active data transmission are assigned such that some lines do not start transmission at the start of the TDD frame, but with some delay in the middle of the frame.

The transmission times may also be assigned such that all lines start to transmit at the start of frame and transmit the number of symbols required to reach the target data rate. This method simplifies the communication overhead for discontinuous operation, because then only the end of transmission must be communicated from transmit side to receive side while the start of transmission is fixed.

But due to limitations in the crosstalk cancellation capabilities or coefficient recalculation speed, the delayed start of transmission as shown in the simulation may be required in some cases.

The above-discussed methods for discontinuous operation may be facilitated during initialization in some embodiments. The line joining or system activation procedure contains multiple steps. Various standards and standard proposals, e.g. for G.fast, describe a possible initialization procedure in detail. It may contain many steps for channel estimation, synchronization, setting transmit PSD levels and other tasks. For discontinuous operation, the associated and critical step is the transmit PSD optimization before showtime, as shown in FIG. 6A.

The DP calculates precoder and equalizer coefficients based on sync symbols. They are transmitted once per superframe and are not subject of discontinuous operation.

Therefore, the precoder and equalizer coefficients after the line joining are calculated for a configuration in which all lines are active in some embodiments.

We assume a set of active lines $1_a$ with $|1_a|=L_a$ lines and a set of joining lines $1_j$ containing $|1_j|=L_j$ lines. With this assumption, we show how to apply minimum configuration in embodiments.

Next, joining of lines with minimum configuration will be discussed.

FIG. 6B illustrates a method for providing a common bit loading table for multiple customer premises equipment (CPEs) in a network using discontinuous operation for transmitting data in a vector crosstalk cancellation environment, the method comprising the steps of: determining in advance a set of bit loading tables for combination of lines being in a transmit and quiet mode; and selecting a minimum gain from the plurality of bit loading tables and constructing the common bit loading table from the minimum gains.

Figure 7:
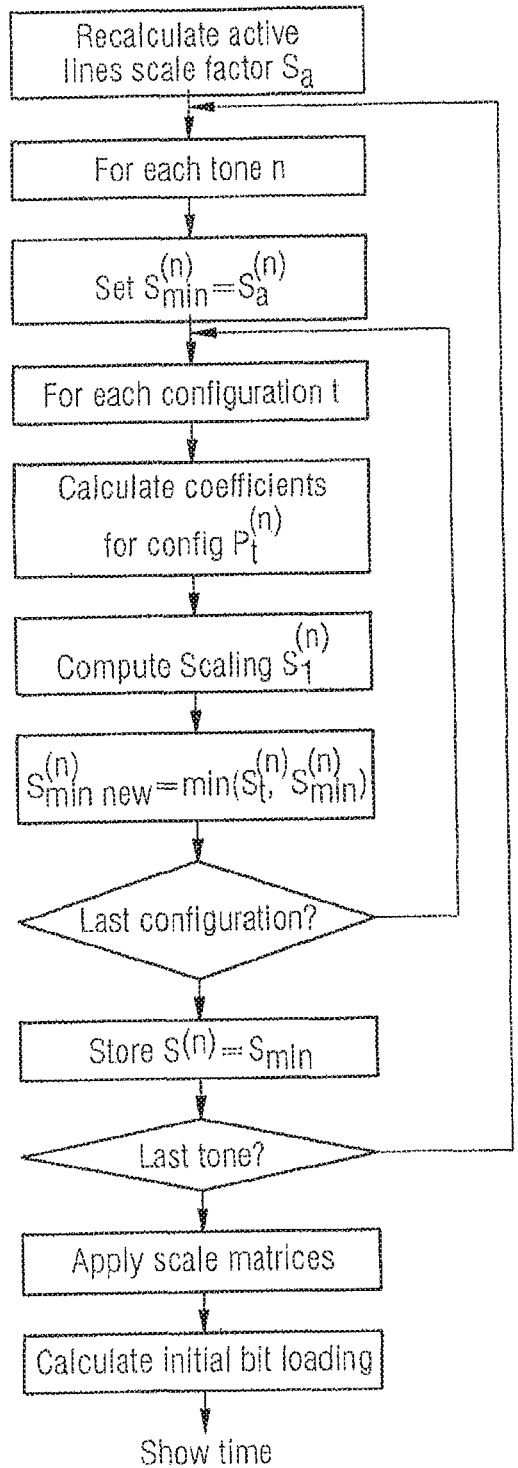
FIG. 7 illustrates a flowchart according to an embodiment illustrating line joining with discontinuous operation.

The search of the minimum configuration in embodiments takes place at the spectrum optimization step of the joining sequence as shown in FIG. 6A. The required information includes the full precoder and equalizer coefficient matrices (including both, active and joining lines) and a SNR estimation from the joining and active lines. This SNR estimation is local for the case of upstream and shall be provided by each of the CPEs for the case of downstream. FIG. 7 summarizes steps to be done for transmit spectrum optimization with discontinuous operation in some embodiments.

The downstream SNR data is provided by the CP by sending corresponding messages from the CPE to the DP. It shall be available for the computation of new Scaling $S_t^{(n)}$ in FIG. 7.

It must be noted that the precoder coefficients after line joining require a re-scaling of the precoder matrix to comply with Eq. (1.17) which guarantees that the diagonal elements are equal to 1 to match the definition in Eq (1.2). The inverse of the scaling must be multiplied to the scale matrix $S_a$ to make sure that it matches Eq. 3.1 for the active lines.

The exhaustive search over all $2^L$ possible configurations which is necessary for (3.1) can be reduced to $$s_{ii} = \min\left(s_{aii}, \min_{t \in \mathbb{I} \wedge t \notin \mathbb{I}_a}(s_{iit})\right) \tag{3.4}$$

which means that e.g. for a system with 9 active lines and the 10th line joining, only 512 ($2^L$-$2^{L_a}$) instead of 1024 ($2^L$) configurations must be searched.

Nevertheless, the search over all possible configurations may be complex and might be simplified by limiting the search to critical configurations, for example the configurations where only one line leaves and the configurations where only two lines are left active.

Next, protocol additions for discontinuous operation according to some embodiments will be discussed.

To implement the described techniques, an exchange of information between DP and CPE is required in some embodiments. This section describes the details of the protocols for some embodiments. Similar or related information exchange may be used in other embodiments.

Next, protocols for discontinuous operation and line joining according to embodiments will be discussed.

During joining of new lines, additional resources are allocated to serve the joining lines by reducing the transmit PSDs of the active lines. FIG. 6A shows the initialization sequence which is used to start a line of a vectored group or to join a new line to the operating vectored group. When new lines join, the size of the precoder matrices (downstream) and equalizer matrices (upstream) is extended in two steps. First, the coupling paths from joining lines into active lines are estimated and the corresponding crosstalk is canceled and then, the crosstalk from the active lines into the joining lines is canceled.

The size of the precoder matrices (downstream) and equalizer matrices (upstream) is extended in two steps. First, the coupling paths from joining lines to active lines are estimated and the corresponding crosstalk is canceled and then, the crosstalk from the active lines into the joining lines is canceled.

The optimization of the transmit spectrum and setting final transmit PSDs follows crosstalk cancellation steps and is very time consuming. It also requires SNR estimation from the joining lines with canceled crosstalk and active lines. Therefore in majority of implementations it is only done once, at the step of the initialization sequence during which final transmit PSD value is set. During the joining process, discontinuous operation in all lines is limited, which means that the frontends of all lines are kept active or switched of jointly.

Next, a bit loading protocol in downstream direction will be discussed.

In conventional systems like VDSL, the receive side monitors the SNR and determined a specific bit loading with respect to the measured SNR. Due to the fact that the SNR in discontinuous operation depends on the applied configuration of active or discontinued lines, the bit loading shall be selected with respect to the configuration representing the worst case SNR. When the minimum configuration is used as described above, this is the setting when all lines are active. A symbol which is guaranteed to be transmitted with this configuration is the SYNC symbol. Therefore, in one embodiment SNR measurement shall be done during sync symbols.

Next, a bit loading protocol in upstream direction will be discussed.

In upstream, the DP in embodiments is able to assign additional SNR margin on specific lines and subcarriers to maintain stability. If SNR is evaluated only on SYNC symbols, as for downstream.

The noise covariance matrix $C_{rx}$ after a vector equalizer is given by $$C_{rx} = G \cdot (\sigma_{noise}^2 \cdot I) \cdot G^H \quad (3.5)$$

with the noise covariance matrix $(\sigma_{noise}^2 \cdot I)$ and G being an equalizer matrix.

The frequency dependent additional SNR margin required in upstream is given by $$\Gamma_{DO}(f) = \Gamma \frac{diag(\max_{t=1...T} C_{r \times t}(f))}{diag(C_{t \times all\ active}(f))} \quad (3.6)$$

The relative margin is evaluated once during joining, but it may be updated in showtime due to changes in the coefficient matrix or the receiver noise.

Next, frequency equalization (FEQ) and noise environment will be discussed.

For the implementation of downstream spectrum optimization as described further below, information from the CPEs is needed to estimate data rates. The required information from the CPE side is the SNR obtained for the crosstalk free case (or for case the crosstalk is substantially cancelled). This information is required at the spectrum optimization step of the initialization sequence shown in FIG. 6A. A number of embodiments using different methods and approaches are presented next.

Method 1: SINR

One method is to measure signal-to-noise ratio at CPE side by detecting the average error power. The signal-to-interference-noise-ratio (SINR) SINR; of line i in downlink direction is given by $$SINR_i = \frac{\sum_{t=1}^{T} |\hat{u}_{it}|^2}{\sum_{t=1}^{T} |e_{it}|^2} \quad (3.7)$$

where the error e is defined as $$e_{it} = \hat{u}_{it} - u_{it}. \quad (3.8)$$

T is the number of symbols used for averaging, which is selected sufficiently large. The drawback of this method is that the receiver error e may contain residual crosstalk due to limitations of the crosstalk canceller or just because the crosstalk canceller coefficients are not fully converged. The error e is usually calculated as the difference between the receive signal and the closest constellation point of the receive signal. If the closest constellation point is not equal to the transmitted data, the error is not calculated correctly.

Method 2: SNR Zero-State

To avoid the impact of residual crosstalk and detection errors, the SNR estimation may be limited to the sync symbols, which are modulated with an orthogonal sequence that is known to the receiver. However, each receiver only knows the orthogonal sequence used from the corresponding transmitter. The orthogonal sequences used by the other transmitters are not known and can't be used estimate the crosstalk signal from other lines.

In some approaches, orthogonal sequences including a zero-state were proposed. This allows the CPE side to estimate the crosstalk-free error on line i by selecting the transmit signal $u_l=0$ for $l \neq i$ and $u_l \neq 0$ for $l=i$. With this method, the error on line i according to Eq. 3.8 is crosstalk-free and turns into $$SNR_i = \frac{\sum_{t=1}^{T} |\hat{u}_{it}|^2}{\sum_{t=1}^{T} |e_{it}|^2} \quad (3.9)$$

Method 3: SNR BPSK Sequence

If the orthogonal sequence applied to the sync symbols for channel estimation is static, it is possible to eliminate crosstalk in the SNR estimation using the orthogonal sequence. For this, the number of symbols T used for averaging is selected to be a multiple of the sequence length $T_{seq}$, $T = N_{seq} \cdot T_{seq}$. The sequence length $T_{seq}$ shall be selected as short as possible to have some noise in the estimation. The crosstalk-free SNR is calculated at CPE side by evaluating $$SNR_i = \frac{1}{T_{seq}} \sum_{n=0}^{N_{seq}-1} \frac{\left| \sum_{t=n+1}^{t=n+T_{seq}} u_{it} \cdot \hat{u}_{it}^* \right|^2}{\left| \sum_{t=n+1}^{t=n+T_{seq}} u_{it} \cdot e_{it}^* \right|^2}. \quad (3.10)$$

The invention proposes to request the crosstalk-free SNR from the CPE side as basis for the spectrum optimization. This is an extension to Method 2 and 3. The reported crosstalk-free SNR represents the term $$\frac{|[H^{-1}]_{ii}^{-1}|^2}{\sigma_{noise}^2} \text{ in Eq. (1.20).}$$

The invention furthermore proposes to reduce time and increase precision of required to evaluation of Eq. (3.9) or Eq. (3.10) by performing the averaging not only over time, but also on multiple adjacent tones. While the channel transfer function and the transmit PSD may vary widely from subcarrier to subcarrier, the noise itself is usually flat.

Assuming that the transmit signal u has unit power, averaging may be performed over a group of tones tones, the effective noise power $\sigma_{noise}^2$ $$\sigma_{noise}^2 = \sum_{n \in tones} \sum_{t=1}^{t=T} |g_{ii}^{(n)}|^{-2} e_{it}^{(n)} \cdot e_{it}^{(n)*} \quad (3.11)$$

can be estimated, which is flat over frequency.

The SNR, which is then given by $$SNR_i = \frac{1}{|g_{ii}^{(n)}|^2 \sigma_{noise}^2}$$

is communicated to the DP to run the optimization.

The power consumption of a distribution point will be reduced significantly, if active links are disabled whenever there is no data to transmit. On a disabled link, power is not only saved by reduced transmit power. The analog and digital components can be switched into low-power state and consume very low power. This operation mode is called Discontinuous Operation.

The use of discontinuous operation in FTTdp applications causes two major problems.

In wireline communication each line experiences some interference from the data transmission on neighboring lines of the cable binder, called crosstalk. Each link experiences some crosstalk noise and chooses the achievable data rate according to the remaining signal-to-noise ratio. With discontinuous operation, the noise environment is no longer static, but changing very fast.

This causes the first problem which may occur, namely that the noise environment is no longer time invariant and the receivers do not estimate the signal-to-noise ratio and the achievable data rates correctly, which may result in an increased bit error rate.

A second problem occurs in systems applying joint signal processing operations over multiple links like Vectoring. If a transmitter in downlink direction is turned off, the precoder coefficients used before that time do no longer work. The same holds if a receiver in uplink direction is switched off.

The next section addresses the second problem. To keep the performance of active links in a Vectoring system, while other links are switched to low power mode, coefficient recalculation is required. For coefficient recalculation, multiple system configurations are considered, linear precoding in downlink direction, linear equalization in uplink direction and nonlinear precoding in downlink direction.

Crosstalk cancellation and other MIMO (multiple input multiple output) signal processing methods are an important feature to improve performance of multi-user data transmission. Vectoring is successfully used to improve VDSL2 performance and for future wireline communication standards such as G.fast, crosstalk cancellation is mandatory.

Therefore, the proposed low-power modes, e.g. as discussed above, shall be compliant with systems using MIMO signal processing. This section discusses how to implement discontinuous operation in combination with linear MIMO precoding and equalization which has been proposed for FTTdp applications.

Linear vector precoding has been implemented on VDSL 2 systems to improve performance for wireline data transmission over crosstalk channels. The main drawback of conventional Vectoring DSL systems is that all links are enabled continuously and turning a link on or off requires very time-consuming joining and leaving procedures to enable or disable data transmission on a particular line of the vectored group.

Figure 8:
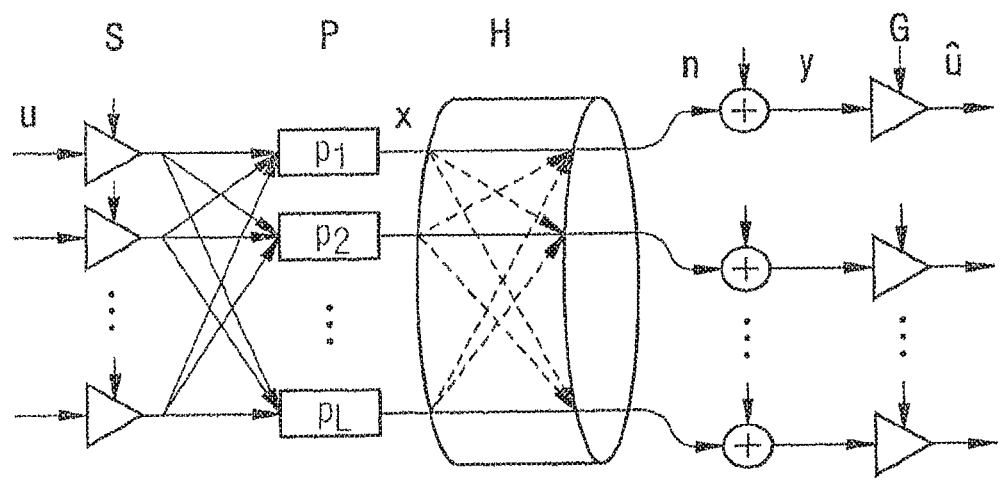
FIG. 8 illustrates a downstream model with a linear precoder.

The downstream transmission model as shown in FIG. 8 is represented by $$\hat{u} = G \cdot (H \cdot P \cdot S \cdot u + n) \quad (1.1)$$

where u is the transmit signal vector of multiple parallel data transmissions at the DP and $\hat{u}$ is the corresponding receive signal at CPE side with the noise n added at the receivers. P is the precoder matrix at DP side, H is the crosstalk channel matrix and G is a diagonal matrix of equalizer coefficients.

The precoder matrix P is normalized according to $$P \times H^{-1} \cdot \text{diag}(H^{-1})^{-1} \quad (1.2)$$

S is the scaling diagonal matrix to do transmit spectrum shaping. It is used to scale the transmit power relative to the limit transmit PSD mask. The linear vector precoder P performs crosstalk cancellation by precompensation of the crosstalk. The diagonal matrix G consists of one nonzero coefficient per line and per subcarrier at the CPE side and is used to perform gain and phase correction of the direct path between transmitter and receiver.

In multicarrier systems, Eq. (1.1) describes the operation of one subcarrier and each of the subcarriers are precoded independently.

Figure 9:
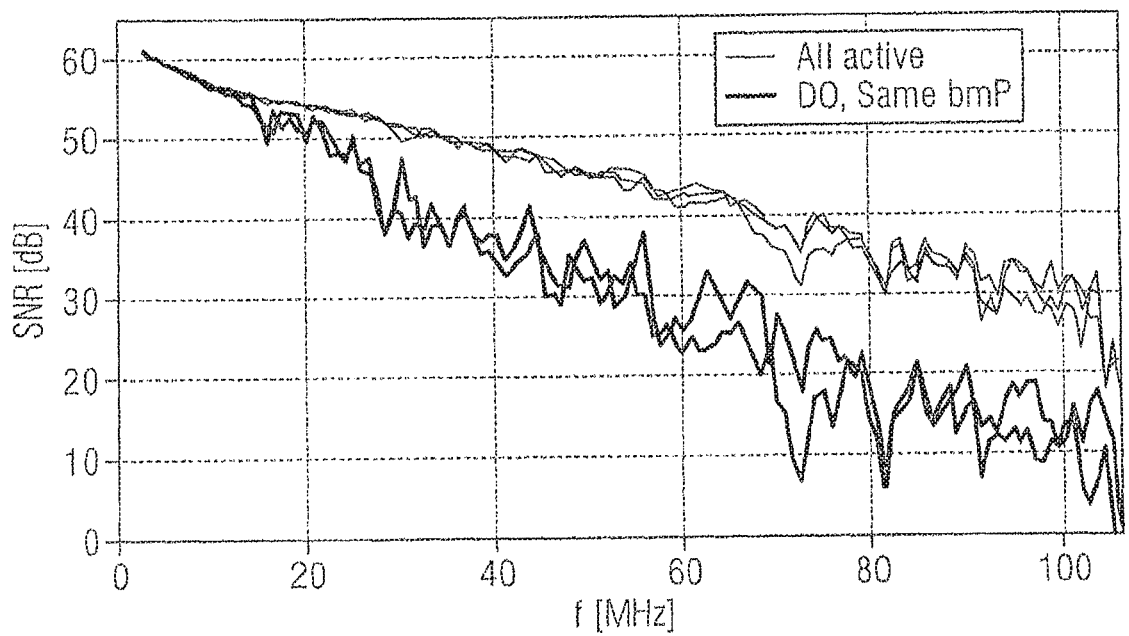
FIG. 9 illustrates a drop of signal to noise ratio (SNR) of active lines when other lines are discontinued.

For the proposed low power mode according to embodiments, some of the transmitters shall be switched off. This corresponds to the operation of setting the corresponding rows and columns of the precoder matrix P to zero. If this is done without changing the coefficients of the precoder matrix P, the remaining active lines will experience significant performance drops as shown in FIG. 9. The simulation shows that discontinuous operation can only be implemented for very low frequencies (where FEXT is small compared to the received signal) without coefficient correction. Tab. 1.1 below summarizes the simulation parameters used for the calculation.

To cancel crosstalk between the remaining lines in this state, the precoder coefficients for the active lines must be recomputed. For the following derivation, the equalizer matrix G is neglected without loss of generality, as the equalizer matrix can be included into the channel matrix H. Then, in the case of all lines active, $$H \cdot P = I \quad (1.3)$$

holds.

With the precoder and channel matrix rewritten as block matrices, $$\begin{bmatrix} H_{aa} & H_{ad} \\ H_{da} & H_{dd} \end{bmatrix} \cdot \begin{bmatrix} P_{aa} & P_{ad} \\ P_{da} & P_{dd} \end{bmatrix} = \begin{bmatrix} I & 0 \\ 0 & I \end{bmatrix} \quad (1.4)$$

1.

TABLE 1.1

Parameters of simulation example

| Parameter | Value |
| --- | --- |
| Lines in binder | 10 |
| Binder length | 100 m |
| Cable type | BT cable |
| Direction | downlink |
| Transmit PSD | −76 dBm/Hz flat |
| Noise PSD | −140 dBm/Hz flat |
| Spectrum | 2 MHz-106 MHz |
| Transmit power | 2 dBm | holds for the linear zero-forcing precoder in case that all lines are active. The index a denotes the active lines and the index d denotes the disabled lines. For example, the block matrix $H_{ad}$ contains the couplings from the disabled to the active lines.

For the case of all lines active Eq. (1.3) must hold which can be divided into block matrices as shown in Eq. (1.4). After turning the set d of transmitters off $$H_{aa} \cdot P'_{aa} \times I \quad (1.5)$$

must hold, where $P'_{aa}$ is the new precoder matrix in low power mode. The new precoder matrix for the remaining active lines is given by $$P'_{aa} = P_{aa} - P_{ad} \cdot P_{dd}^{-1} \cdot P_{da} \quad (1.6)$$

according to the matrix inversion lemma.

Instead of recomputation of the precoder matrix coefficients $P'_{aa}$, it is also possible to recomputed the transmit signal during low power mode. The transmit signal vector x is given by $$x = P \cdot u. \quad (1.7)$$

Then, the transmit signal of the active lines with some lines discontinued is given by $$x_a = P_{aa} u_a - P_{ad} \cdot P_{dd}^{-1} \cdot P_{da} \cdot u_a \quad (1.8)$$

Figure 10:
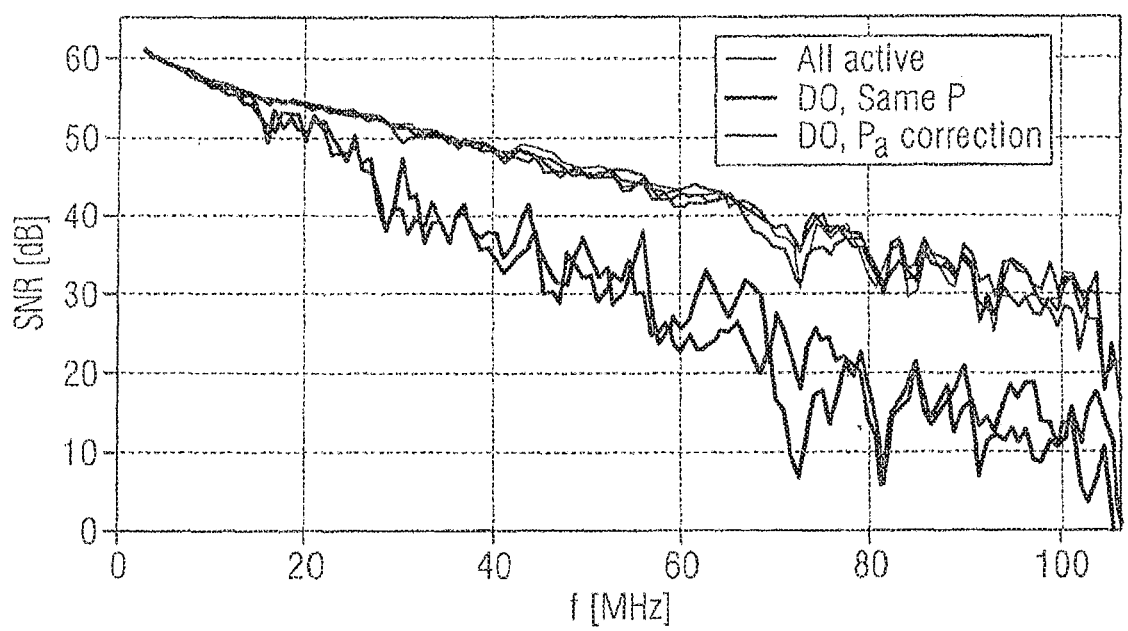
FIG. 10 illustrates an example for an effect of coefficient recalculation on a signal to noise ratio (SNR) of active lines during a low power mode.

After precoder coefficient correction (Eq. (1.6)) or signal recalculation (Eq. (1.8)), the SNR of the active lines is recovered when other lines are turned off, as shown in FIG. 10.

It must be noted that any change of the precoder coefficients changes the transmit spectrum. Therefore, the coefficient recalculation may cause violations of the transmit power constraints which require a re-computation of the transmit powers. This is explained further below in more detail.

In upstream direction, linear vector equalization is used instead of linear precoding.

Figure 11:
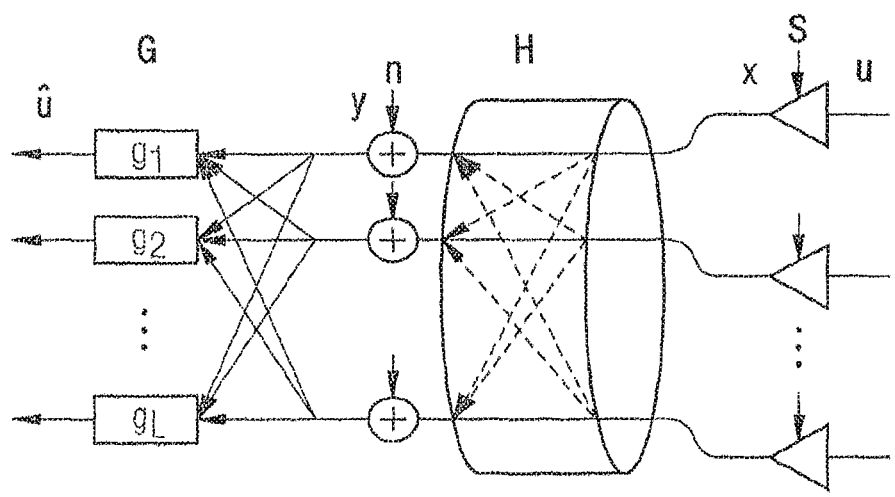
FIG. 11 illustrates an upstream model with a linear equalizer.

The system model is shown in FIG. 11 which corresponds to $$\hat{u} = G \cdot H \cdot S \cdot u \quad (1.9)$$

Similar to the downstream direction u is the transmit signal vector, u is the receive signal vector and H is the channel matrix. At CPE side, the diagonal matrix S can be used to scale the transmit power, but with crosstalk cancellation, this is not necessary and it may be set to S=1. Crosstalk cancellation and direct channel gain and phase correction are performed with the equalizer matrix G, which is a full matrix in upstream case.

Similar to the downstream case, coefficient recalculation can be done by $$G'_{aa} = G_{aa} - G_{ad} \cdot G_{dd}^{-1} \cdot G_{da}. \quad (1.10)$$

Alternatively, the recalculation based on the receive signal according to $$\hat{u}_a = G_{aa} y_a - G_{da} \cdot G_{dd}^{-1} \cdot G_{ad} \cdot Y_a \quad (1.11)$$

can be implemented.

This recalculation changes the noise environment, because the receive signal y consists of received signal plus noise y=H·u+n. This change in noise power leads to a SNR change which may require reducing the bit loading.

For vector precoding, nonlinear precoding with the Tomlinson Harashima precoder is discussed as an alternative to linear precoding. In uplink direction, the Generalized Decision Feedback Equalizer (GDFE) is a possible implementation.

This modification of the precoder matrix results in a change of the transmit spectrum, similar as in the linear precoder case. Other nonlinear precoders and equalizers may also be used.

Next, transmit spectrum shaping will be discussed.

Transmit power in wireline communication is limited by regulation and for technical reasons. To satisfy regulatory constraints and to use the available transmit power as efficient as possible, transmit spectrum shaping is used.

The output spectrum of the linear precoder as well as the nonlinear precoder is different to the input spectrum. To keep the crosstalk cancellation capabilities while changing the transmit spectrum, the transmit spectrum is shaped at the precoder input with the scale matrix S as shown in FIG. 8. The transit covariance matrix $C_{tx}$ is then given by $$C_{tx} = PSS^H P^H, \quad (1.12)$$

where the diagonal elements correspond to the transmit power of the individual ports. In wireline communication, the per-line transmit spectrum is constrained by a spectral mask which is equivalent to a maximum transmit power pmax $$C_{tx\ ii} \le p_{max} \quad (1.13)$$

which in general depends on frequency. This section shows two spectrum shaping approaches for wireline communication with linear precoding in downlink direction.

A simple approach is to select the scale factors for a transmit spectrum scaling with respect to the line with the highest gain. Then, the scale factors are given by $$s_{ii} = \sqrt{\frac{p_{max}}{\max diag(PP^H)}}. \quad (1.14)$$

This spectrum scaling method guarantees that the output spectrum complies with the spectral mask on all lines, but only one line will be close to the maximum, while the other lines are scaled lower than that. In general, there is no input transmit spectrum such that all lines can transmit with maximum power. But it is possible to calculate an input spectrum such that the data rates are maximized as shown in the next section.

To improve performance, transmit spectrum optimization may be applied. The data rate $R_l$ of link 1 for linear zero forcing precoding is given by $$R_l = \log_2\left(1 + \frac{[H^{-1}]_{ll}^{-1} \cdot |s_l|^2}{\Gamma \sigma_{noise}^2}\right). \quad (1.15)$$

It depends on the channel matrix H, the scale factors S and on the noise variance $\sigma_{noise}^2$.

Equation (1.15) assumes that the SNR is given by $$SNR_l = +\frac{[H^{-1}]_{ll}^{-1} \cdot |s_l|^2}{\sigma^2_{noise}} \quad (1.16)$$

as a function of the channel matrix H, the receiver noise power $\sigma_{noise}^2$ and the scale matrix S. This holds for a linear zero forcing precoder, where the transmit signal $u_l$ of line 1 before gain scaling has unit power. Furthermore, the precoder matrix P is scaled such that the diagonal elements are equal to 1, according to $$P = H^{-1} \cdot diag(H^{-1})^{-1}. \quad (1.17)$$

The optimization is done with an objective function for all lines, which is here the sum data rate. An additional constraint is introduced to take the limited modulation alphabet into account. There is an upper bound $b_{max}$ and a lower bound $b_{min}$, usually $b_{min}=1$ for the bit loading b per tone and line. This translates in a maximum required SNR $$SNR_{max}=2^{b_{max}}-1 \qquad (1.18)$$

and a minimum SNR $$SNR_{min}=2^{b_{min}}-1. \qquad (1.19)$$

The maximum bit loading and the limit PSD is reformulated in a linear constraint set of the form A·x=b. Instead of maximizing with respect to the gain values $s_i$, the squared gain values $|s_i|^2$ are used as arguments for the optimization problem $$\max_{|s_1|^2...|s_L|^2} \sum_{l=1}^{L} R_l \text{ s.t. } \sum_{i=1}^{L} |p_{li}|^2 |s_i|^2 \le p_{max} \forall\, l=1...L \qquad (1.20)$$

$$|s_l|^2 \ge 0 \forall\, l=1...L$$

$$\frac{|[H^{-1}]_{ll}^{-1}|^2 \cdot |s_l|^2}{\sigma_{noise}^2} \le 2^{b_{max}}-1 \forall\, l=1...L.$$

The arguments which solve this optimization problem are the sum-rate optimal scale factors.

Also, in embodiments, transmit spectrum variation may be employed.

With the coefficient recalculation as explained above, the transmit spectrum changes and some tones may violate the constraint from Eq. (1.13) as shown in FIG. 3.1. To allow low power modes on a per-symbol basis without the re-computation of the transmit spectrum and avoid violations of the transmit spectrum, the transmit spectrum must be chosen such that the constraints are not violated for any configuration.

If the scale coefficients of the matrix S are limited to be real and positive, the output transmit powers diag($C_{tx}$) are an increasing function of the scale factors. Therefore, it is possible to satisfy the transmit power constraint for all possible configurations by configuring the scale factors to the minimum scale factor of all configurations.

This is a stable configuration which is guaranteed to work for all possible low power mode configurations which will occur during operation.

The term "quiet mode" referring to a line as used herein may refer to a deactivated line, a line in no-power mode, a line transmitting quiet symbols, a line transmitting idle symbols with no transmit power and the like.

Figure 12:
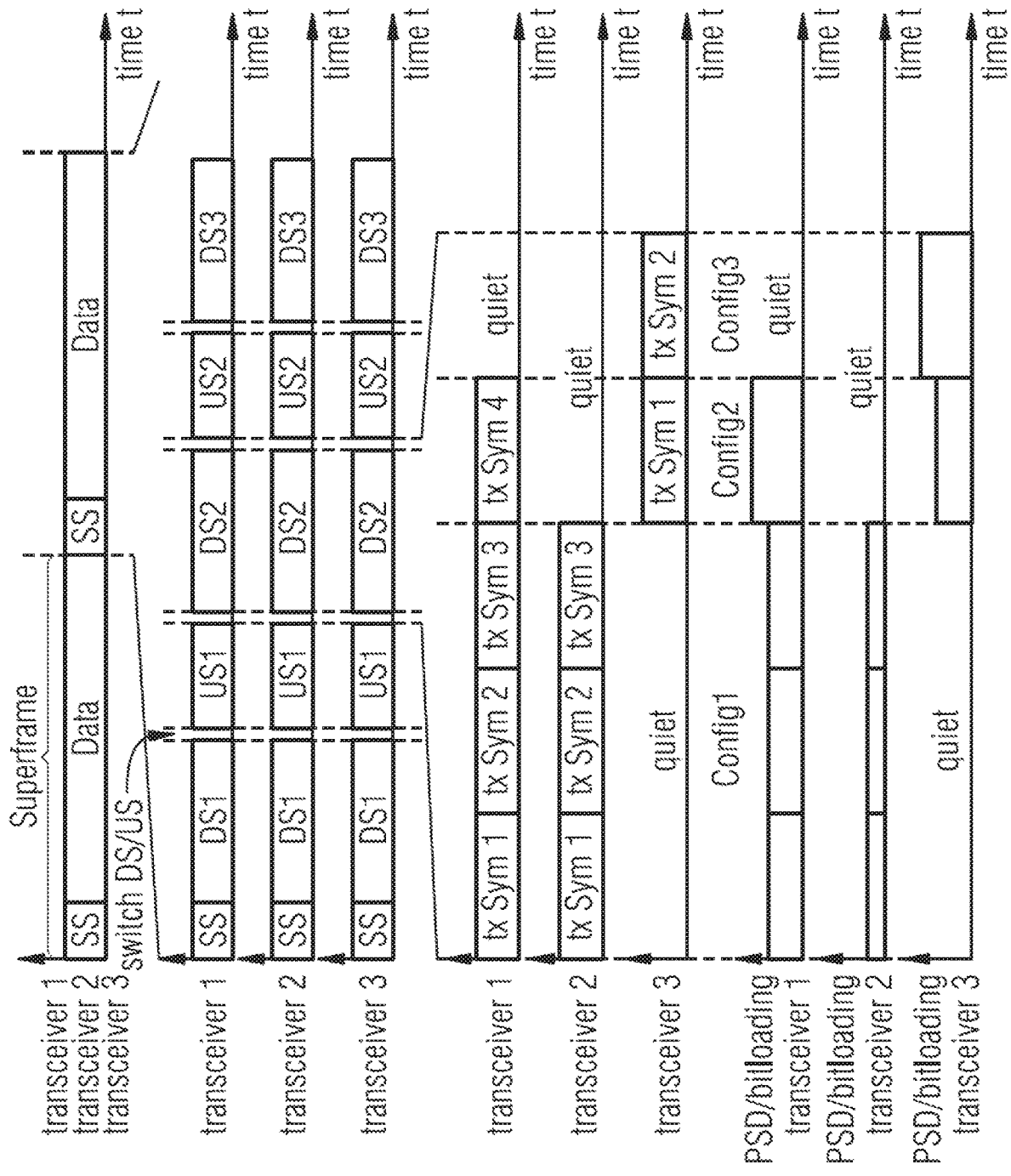
FIG. 12 illustrates a frame format for timesharing according to embodiments.

The idea of timesharing as applicable in some embodiments is shown in FIG. 12. Each superframe is split up into multiple sections which may use different configurations of enabled and disabled links and different bits and gains settings. Such an optimization method can be used to improve data rates in a transmission system, but it can also be used to reduce power consumption in combination with discontinuous operation in embodiments.

The number of different configurations per superframe is limited by the number of DMT frames or less than that, depending on the available memory and coefficient recalculation capabilities.

In embodiments, both, DP and CPE know in advance the timing information for the next symbols.

In embodiments, there is one base configuration for the case of all links active. Precoder and equalizer coefficients for crosstalk precompensation and crosstalk cancellation (also referred to as equalization), respectively are calculated for the base configuration. Sync symbols are transmitted using the base configuration and the channel is estimated using the base configuration in embodiments.

The schedule of a TDD (time division duplexing) frame is exchanged between the DP and the CPEs to inform transmit side about the symbols where data shall be transmitted and the rate to be used to transmit and to inform the receive side about the time when the data arrives and how to decode it.

The time sharing system in embodiments has one or more of the following properties:
Handling of multiple configurations of transmitter and receiver parameters.
Joint optimization of schedule of multiple transmitters.
The schedule is exchanged between transmitter and receiver.

The above-explained timesharing will now be used as a basis for implementing discontinuous operation for FTTdp applications according to some embodiments.

A property of timesharing is that is simplifies the construction of optimal schedulers for many different optimization problems such as rate optimization and power minimization. Furthermore, it simplifies the consideration of hardware limitations in the optimization.

In some conventional approaches, timesharing was used to maximize data rates. In some embodiments, a different optimization problem is solved. Instead of maximizing the data rates with respect to transmit power constraints, in embodiments the power consumption is minimized with respect to minimum data rates.

For each line i of a plurality of lines a target rate $R_{target\ i}$ is defined.

The system maintains multiple sets of bit loadings and scale factors (e.g. bit loading tables and gain tables), which are optimized for a specific set of active lines or a group of sets of active lines.

At each time instance, t, the link i achieves the data rate $R_{t\ i}$ and consumes the power $p_{t\ i}$.

The configuration of time instance t is used for a fraction $\alpha_t$ of the transmission time of a TDD frame.

For the time fractions $\alpha$ $$\sum_{t=1}^{T} \alpha_t = 1 \qquad (4.1)$$

holds. The fraction $\alpha$ may be selected with respect to the integer number of $N_{sym}$ symbols in a superframe to be $$\alpha = \frac{n}{N_{sym}}, N_{sym}, n \in \mathbb{N}.$$

We define the effective link data rate as follows:

$$R_i = \sum_{t=1}^{T} R_{t_i} \cdot \alpha_t. \qquad (4.2)$$

The average per-link transmit power $p_{link\ i}$ of link i is given by $$p_{linki} = \sum_{t=1}^{T} p_{t_i} \cdot \alpha_t. \qquad (4.3)$$

The aggregate transmit power $p_{config\ t}$ for each configuration t is given by $$p_{configt} = \sum_{i=1}^{L} p_{ti} \quad (4.4)$$

Then, there is an optimal configuration of transmit times for each subset of active lines which achieves the target data rates with minimum power consumption. To find it, the optimization problem $$\min_{\alpha_t t \in 1 \ldots T} \sum_{i=1}^{L} P_{linei} \ s.t.\ R_i \geq R_{targeti} \ \forall\ i = 1 \ldots L \quad (4.5)$$

is solved in embodiments.

The maximum number of possible configurations for L ports is $2^L$, which is already a very high number for the target sizes of 8 or 16 ports. For the operation of the timesharing optimization, it is not necessary to search over all possible configurations. It is sufficient to optimize over some preselected configurations of interest.

They may be selected with respect to hardware constraints or according to the link qualities and line rates.

The number of different configurations that is contained in the solution will be less or equal to the number of lines L which is the number of different configurations to be stored. For each individual line, the number of stored configurations is even less because only configurations where the line transmits or receives data are stored.

In some applications, there may be a hard constraint on the power consumption of the DP and the CPE, for example if it runs on battery power.

Then, the optimization problem of Eq. (4.5) turns into $$\max_{\alpha_t t \in 1 \ldots T} \sum_{i=1}^{L} R_i \ s.t. \sum_{i=1}^{L} P_{linei} \leq P_{limit}. \quad (4.6)$$

The solution is method is the same for both optimization problems, Eq. (4.5) and Eq. (4.6)

For the timesharing system an optimizer searches the best combination of a set of configurations.

In embodiments, the timesharing optimization for power minimization from Eq. (4.5) or Eq. (4.6) is reformulated as a linear program of the form $$\min_{x} c^T x \ s.t.\ Ax = b,\ x \geq 0 \quad (4.7)$$

The vector x is the argument of the minimization and contains the timing information and the achieved data rates $$x = \begin{pmatrix} \alpha_1 \\ \ldots \\ \alpha_T \\ R_1 \\ \ldots \\ R_L \end{pmatrix}. \quad (4.8)$$

The vector c gives the weight vector for optimization. It contains the power consumption of each configuration according to Eq. 4.4.

$$c = \begin{pmatrix} p_{t1} \\ \ldots \\ p_{tT} \\ 0 \\ \ldots \\ 0 \end{pmatrix}. \quad (4.9)$$

The matrix A and the vector b are used to formulate the linear constraints on the minimum data rates according to Eq. (4.2) in the first L rows and the requirement that the sum of scale factors is equal to 1 as defined in Eq. (4.1) in the last row of A as defined in $$A = \begin{bmatrix} R_{11} & \ldots & R_{t1} & \ldots & R_{T1} & -1 & 0 & \ldots & 0 \\ R_{12} & \ldots & R_{t2} & \ldots & R_{T2} & 0 & -1 & \ldots & 0 \\ \ldots & \ldots & \ldots & \ldots & \ldots & \ldots & \ldots & \ldots & \ldots \\ R_{1L} & \ldots & R_{tL} & \ldots & R_{TL} & 0 & 0 & \ldots & -1 \\ 1 & \ldots & 1 & \ldots & 1 & 0 & 0 & \ldots & 0 \end{bmatrix} \quad (4.10)$$

and b as shown in $$b = \begin{pmatrix} R_{target1} \\ \ldots \\ R_{targetL} \\ 1 \end{pmatrix}. \quad (4.11)$$

The set of configurations T=(1 . . . T) does not need to contain all possible configurations as it is required for transparent operation. It may contain some pre-selected configurations which are most relevant.

The selection may also be limited by implementation constraints. But it must be noted that the set T that is used for the initial optimization can be selected to contain more possible configurations than the set $T_a$ of actually used configurations, which is exchanged between DP and the CPEs.

The matrix A as defined in Eq. (4.10) contains the achievable data rate for each link and each configuration of the set of configurations. To compute them, the scale matrix S, the noise power and the direct channel coefficients are required as shown in Eq. (5.13) and (5.14).

The calculation of the optimal scale matrices can be very time consuming. Therefore, approximations of the rate calculation may be applied here. One approximation is to use the scale factor calculation according to Eq. (5.12) instead of (5.18) for the full configuration set T. An additional approximation for multicarrier transmission such as DMT is to do the rate calculation only for a subset of carriers which is spread over the whole spectrum and interpolate the bit loading between them to predict the data rate.

Only for the reduced set of configurations $T_a$ which is contained in the solution of the optimization problem, the full spectrum optimization is done.

Based on the time required to solve the optimization problem, the number of configurations to be stored and other hardware limitations, different implementations of timesharing discontinuous operation according to various embodiments will now be discussed.

Figure 13:
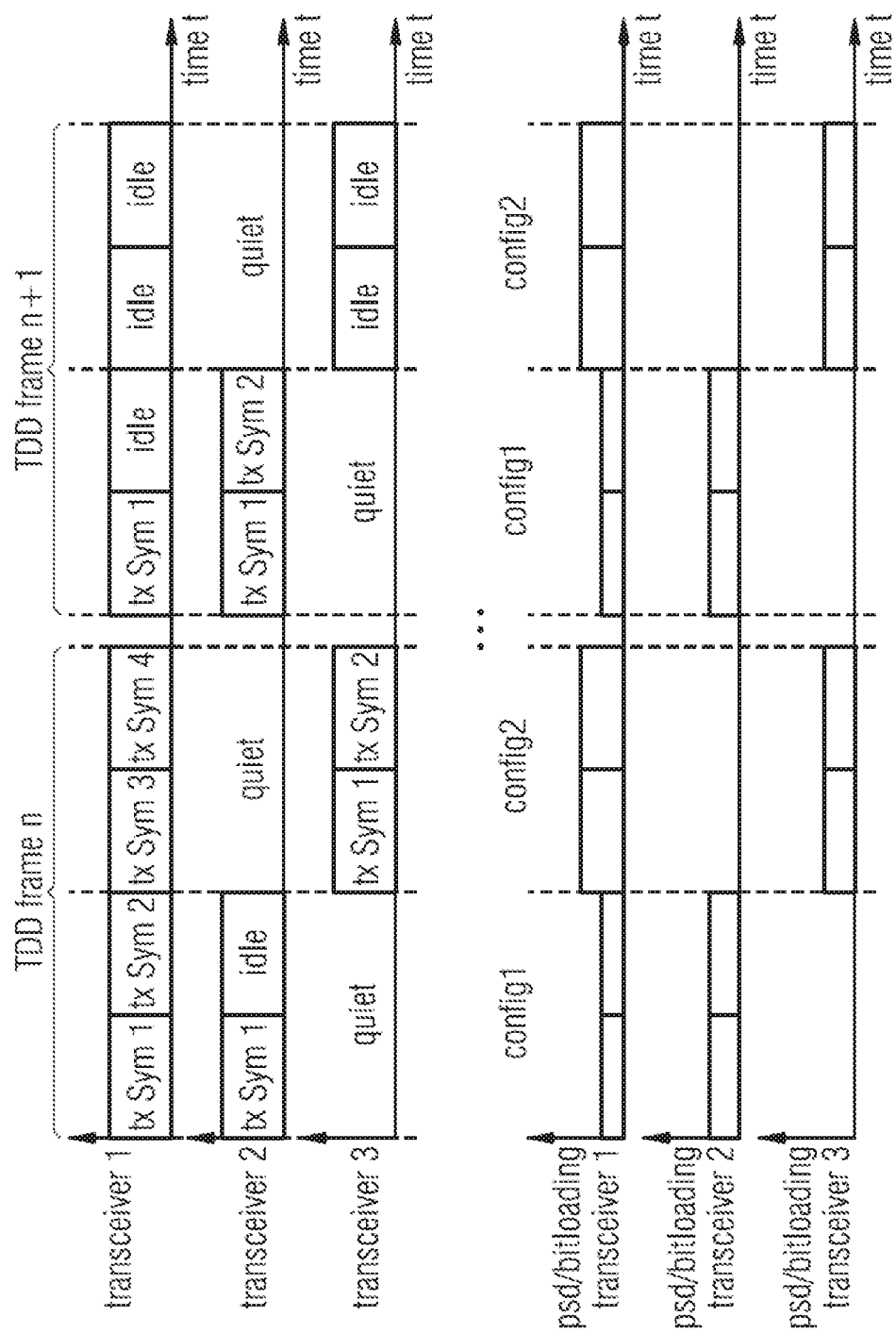
FIG. 13 illustrates an example for twotime division duplexing frames with discontinuous operation in a static mode.

A first implementation will be referred to as static operation. One possible application of timesharing power minimization is to calculate the frame format with respect to the maximum data rates of the users. The schedule is fixed regardless of the actual data rates. FIG. 13 shows the TDD frame format for such a static operation.

The static operation can be used to provide stable target data rates to multiple subscribers with reduced power consumption. However, in static operation it is not possible to serve higher peak data rates or to save power when links are not fully utilized.

If the actual data rate is less than the target rate, idle symbols are transmitted. They might be sent with zero power to reduce power consumption, but the frontend and line driver is then kept in active state to continue transmission of the correction signal for other lines.

Coefficient recalculation for vectoring is used to recompute the precoder and equalizer when some lines discontinue. This is done such that the equalizer for downlink does not change. The bit loading and gain tables are known to the CPE in advance as well as the scheduling. This information is stored at DP and at CPE side.

Reconfiguration of gains, bit loading and schedule is possible using an online reconfiguration message.

This can be improved by a more dynamic operation mode.

Another implementation will be referred to as quasi-dynamic operation. The above-described static operation does not take the actual link usage into account. It always uses the same configuration per TDD frame and fills up the symbols of each link with idle symbols when there is no more data to transmit. In practice, the actual link rates will be $R_{act\ i} < R_{target\ i}$ can be below the maximum available rates.

This can be exploited by using the selected subset of active configurations $T_{active}$ that is already available, but recompute the time fractions $\alpha_t$ for each superframe. The optimization problem to be solved is limited to the number of active configurations and for each superframe $$\min_{\alpha_t t \in T_{active}} \sum_{i=1}^{L} p_i s.\ t.\ R_i \geq R_{act\ i} \forall\ i = 1 \ldots L \qquad (4.12)$$

must be solved.

Figure 14:
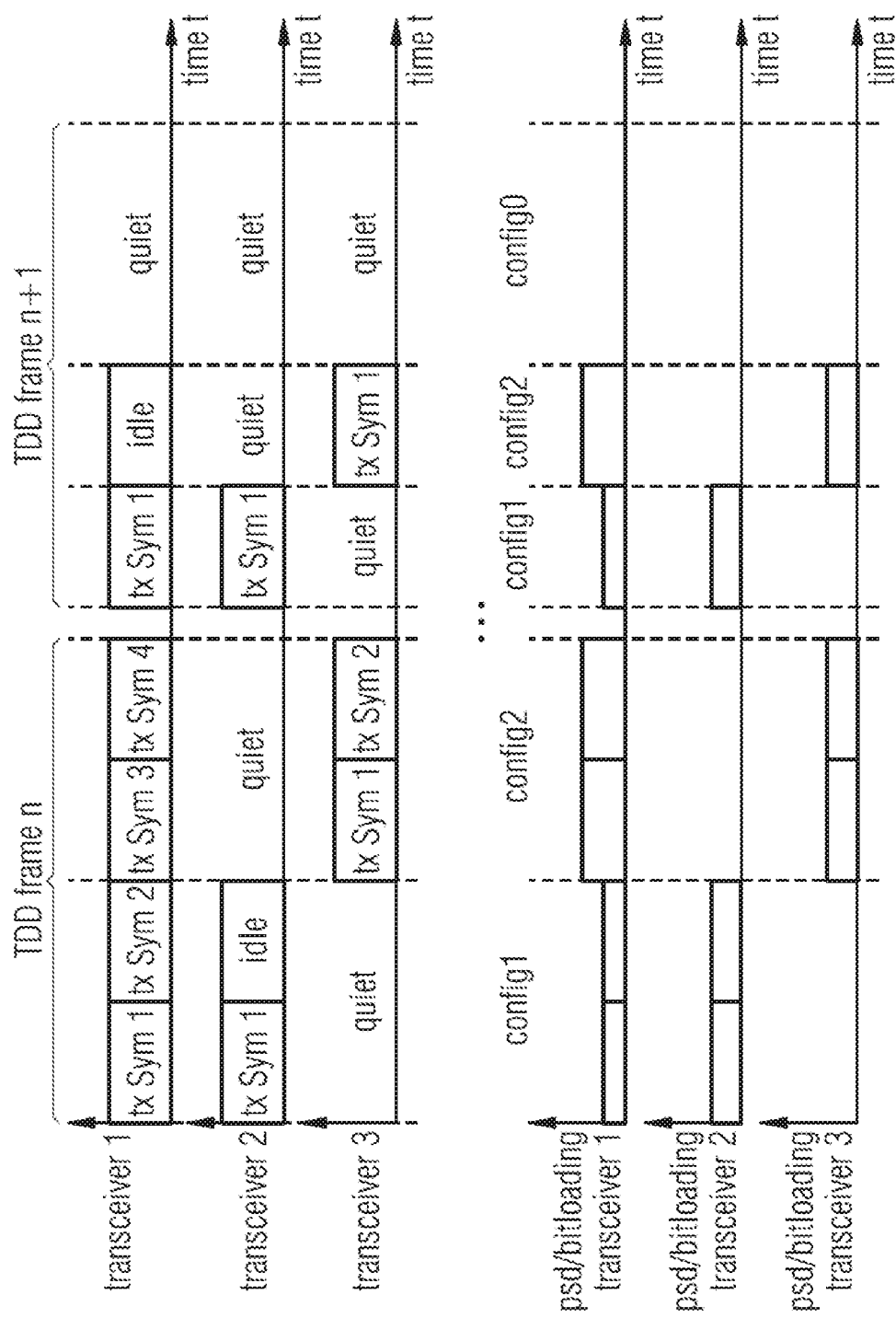
FIG. 14 illustrates an example for twotime division duplexing frames with discontinuous operation in a quasi static mode, according to an embodiment.

This operation mode is shown in FIG. 14.

With this approach, the selection the active configuration subset is only computed once when a line joins or leaves the system. The spectrum optimization which will be explained further below which requires high compute resources is also solved during line joining or leaving for the selected active configurations.

The scheduling problem in Eq. (4.12) is solved per TDD frame with respect to the actual rate requirements. Furthermore, the per-TDD-frame optimization problem has a limited number of dimensions and can therefore be solved easier.

There is not always a configuration where all configured data rates match the actual data rates, because of the limited subset of configurations $T_{active}$. In this case, some of the lines operate at a data rate higher than the actual rate requirements and idle symbols are used to fill the additional data rate. They may also be transmitted with zero power. The schedule for the next TDD frame is communicated from the DP to the CPEs in advance.

The power saving capabilities of quasi-dynamic operation can be improved by a fully dynamic operation.

Another implementation will be referred to as dynamic operation. For dynamic operation, the subset of active configurations can also be changed for each superframe.

Figure 15:
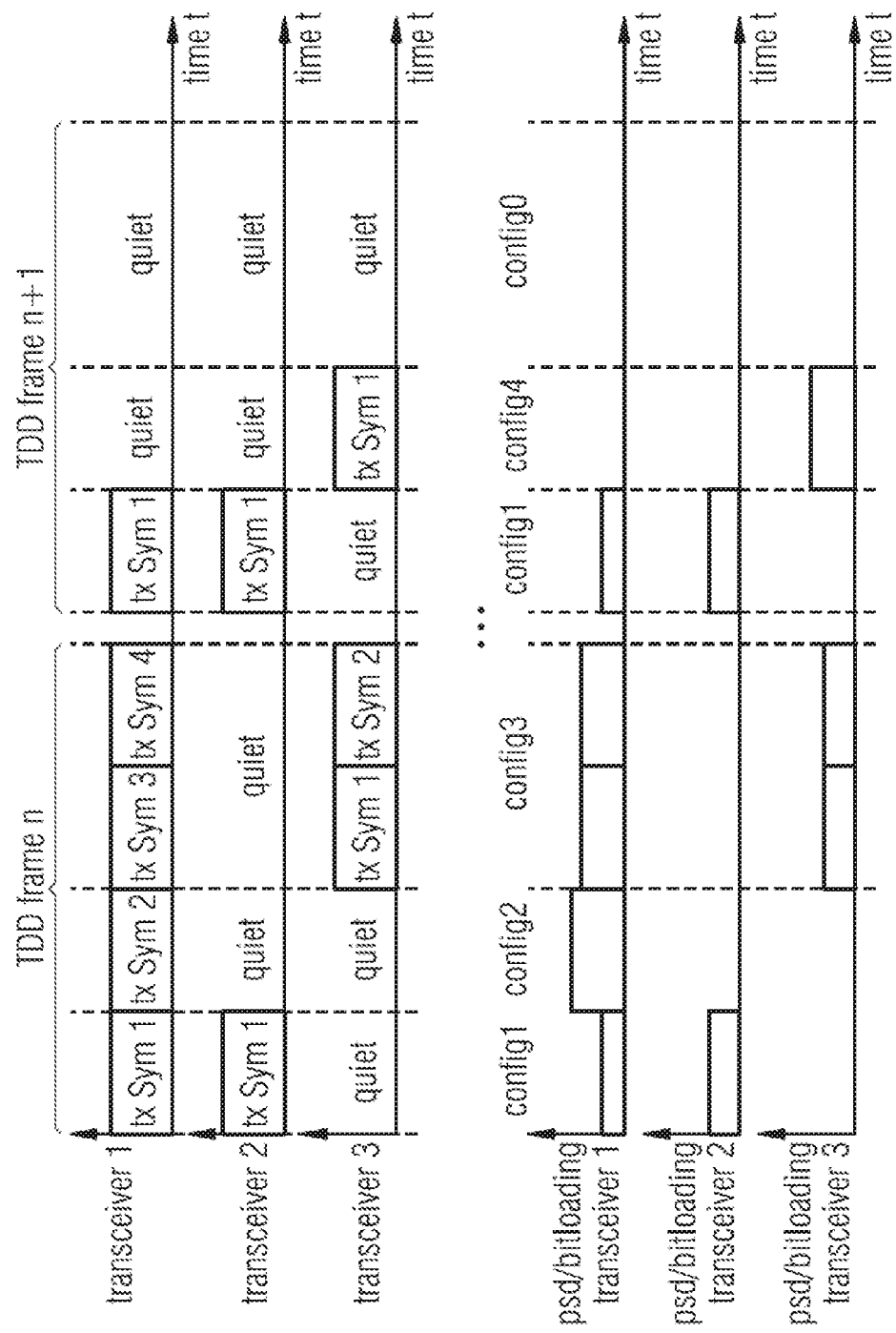
FIG. 15 shows an example for twotime division duplexing frames with discontinuous operation in a dynamic mode.

This means that $$\min_{\alpha_t t \in 1 \ldots T} \sum_{i=1}^{L} p_i s.\ t.\ R_i \geq R_{act\ i} \forall\ i = 1 \ldots L \qquad (4.13)$$

is solved for each TDD frame. The set of active configurations may change between the TDD frames, as shown in FIG. 15.

This may require computation of additional bit loading and gain tables which requires additional computational resources. and creates some management overhead because the reconfiguration may require exchanging bit loading and gain tables between DP and CPE.

This operation mode may achieve highest peak rates and best power saving capabilities. However, the communication overhead and the computational complexity is comparatively high.

A system which is able to handle different configurations of bit loading and gain tables may not only achieve higher data rates. The fact that the data rates of individual configurations are higher translates into additional power saving for given data rates.

Figure 16:
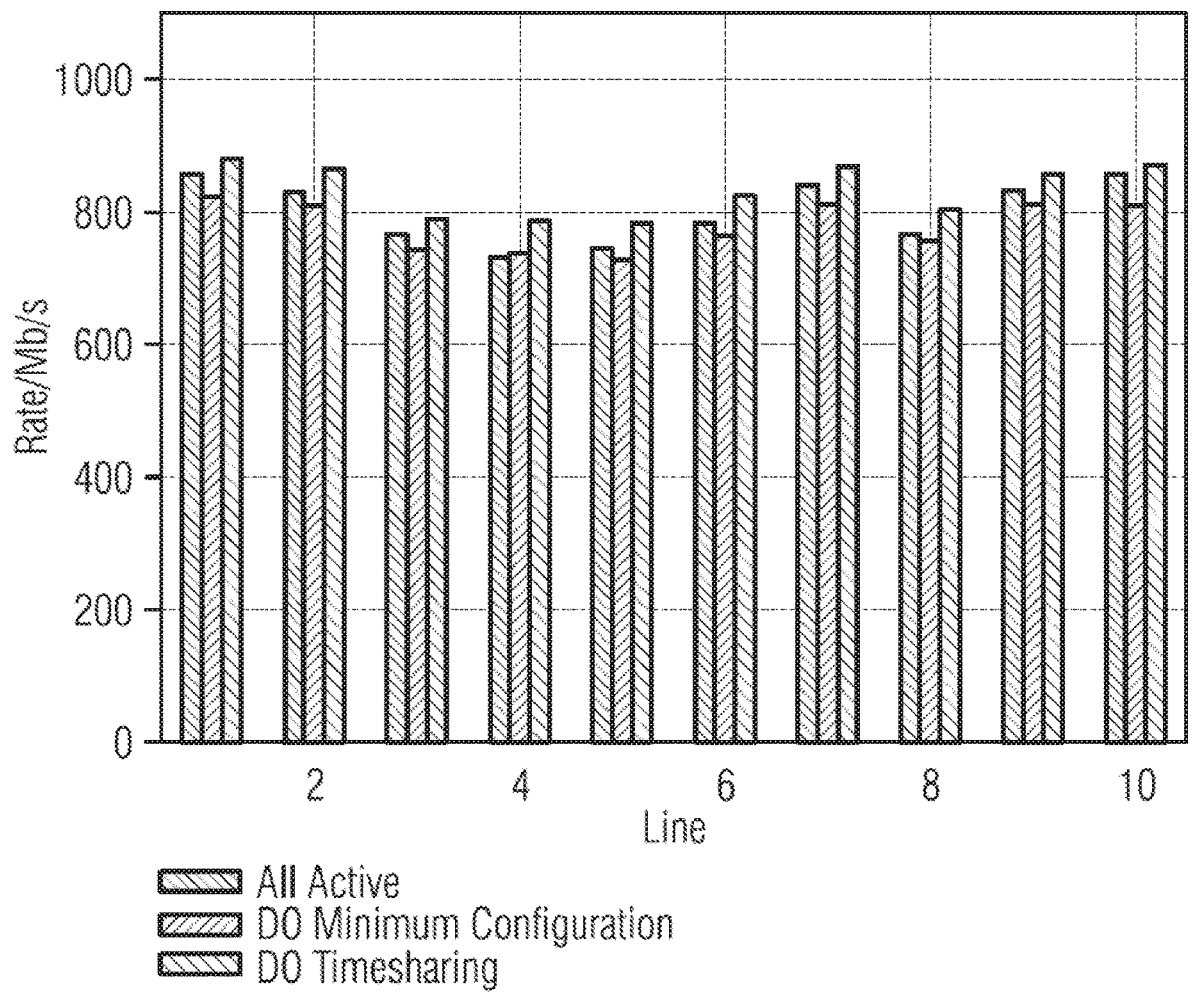
FIG. 16 illustrates a comparison between data rates without discontinuous operation and peak rates in quasi static operation.

In some of the configurations, the actual data rate is higher than the data rate a link when all lines are active. Therefore, it is possible to operate links temporarily at higher rates than the guaranteed rates, as shown in FIG. 16.

To demonstrate the concepts explained above, a cable binder with 10 lines of 100 mlength is evaluated. The target rates are set to 800 Mbit/s for lines 1 to 2, 100 Mbit/s for lines 3 to 6 and 500 Mbit/s for lines 7 to 10. Tab. 4.1 summarizes the simulation conditions of a wireline communication system where the discontinuous operation is applied.

TABLE 4.1

Parameters of simulation example

| Parameter | Value |
|---|---|
| Lines in binder | 10 |
| Binder length | 100 m |
| Cable type | BT cable |
| Direction | downlink |
| Transmit PSD | −76 dBm/Hz flat |
| Noise PSD | −140 dBm/Hz flat |
| Spectrum | 2 MHz-106 MHz |
| Transmit power | 4 dBm |

Figure 17:
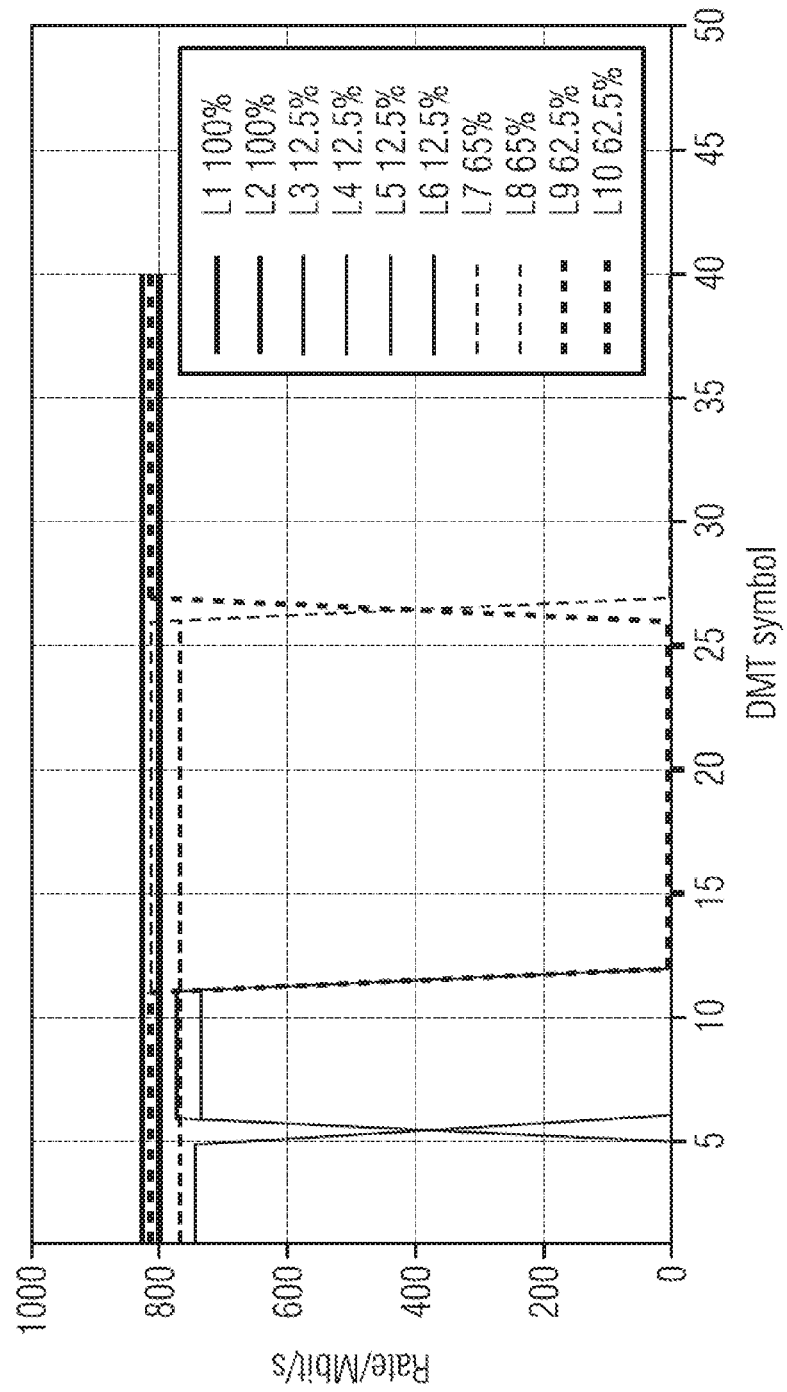
FIG. 17 is a diagram illustrating an assignment of data rates within a time division duplexing frame for a minimum configuration, an overall on time being 51%.

FIG. 17 shows the scheduling for a TDD frame with 40 DMT symbols. The average on-time of the links to achieve this data rates is 51%. Two lines reach their limit rate already. The data rates of the links are constant over the frame, because in transparent mode, the same bit loading is used for all symbols.

Figure 18:
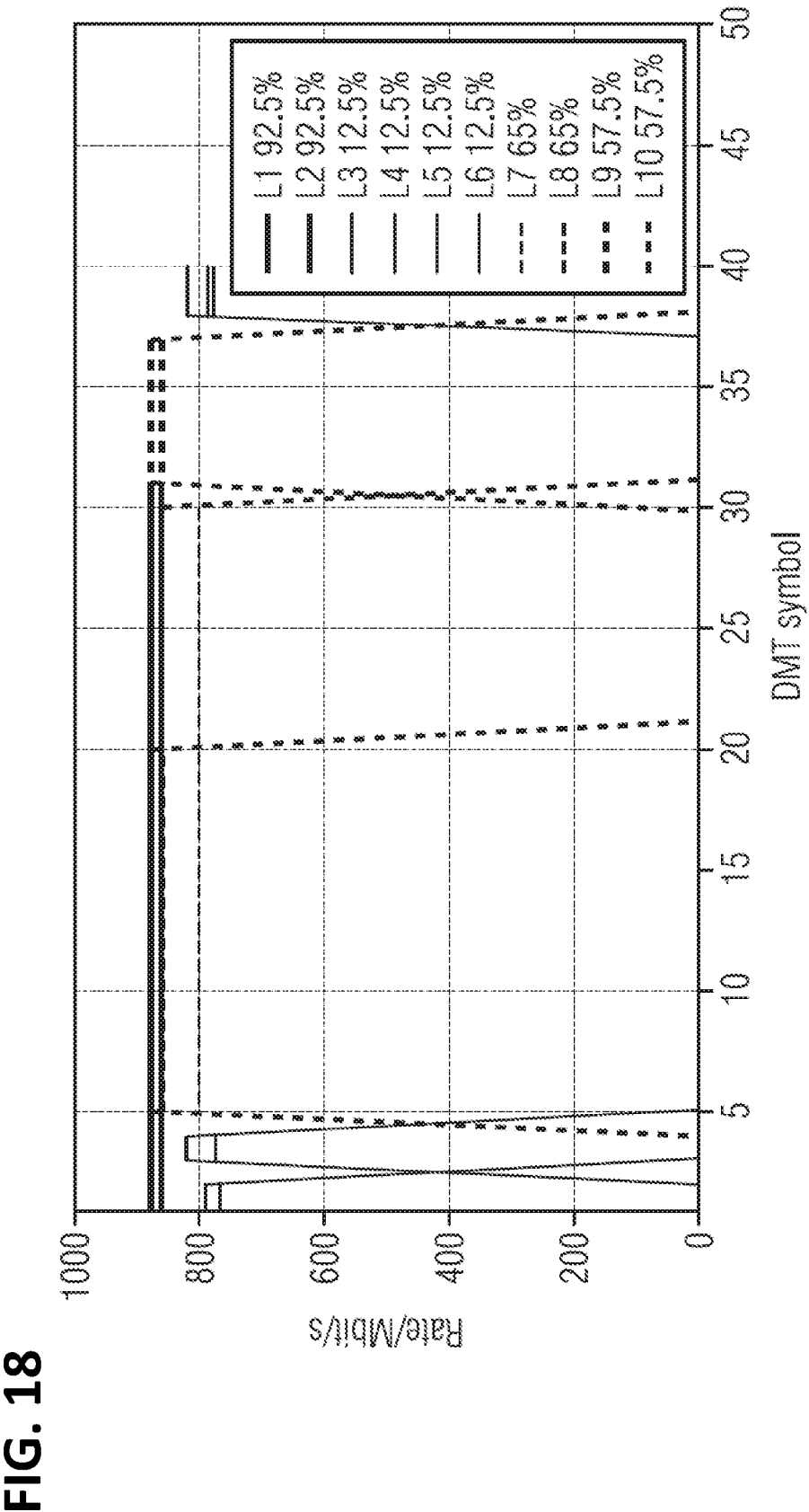
FIG. 18 shows an example assignment of data rates within a time division duplexing frame for timesharing, where an overall on time is 48%.

FIG. 18 shows the same system with the same target data rates using timesharing as discussed above. The average on-time is reduced from 51% to 48% by using timesharing. The data rates with timesharing depend on the set of active lines and are therefore changing over the TDD frame.

The above-discussed simulations and specific values of parameters are not to be construed as limiting and may vary in other implementations, but serve merely to illustrate operation of some embodiments further and improve understanding of some of the concepts discussed herein.

The proposed concepts for discontinuous operation allows improvements in the initialization. The line joining or system activation procedure contains multiple steps. Various standards describe conventional initialization procedures in detail.

Figure 19:
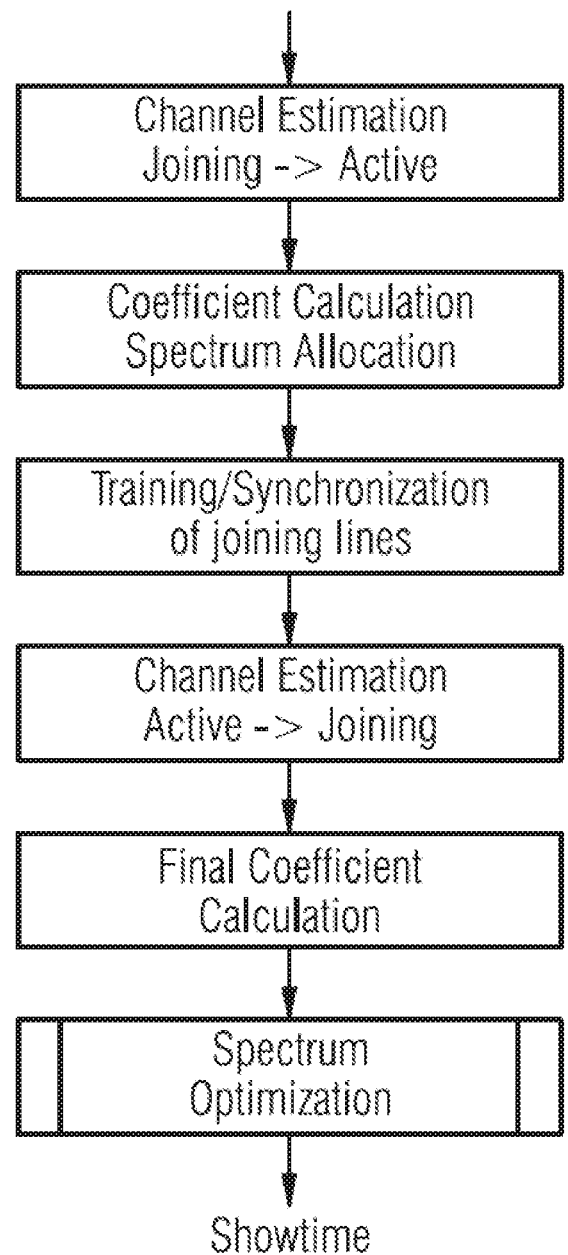
FIG. 19 illustrates a method for line joining.

Such procedures may contain many steps for channel estimation, synchronization and similar tasks. For discontinuous operation, the interesting step is transmit spectrum optimization before showtime, as shown in FIG. 19.

In contrast to the discontinuous operation implementation using the minimum configuration, discontinuous operation using timesharing as explained above in embodiments does not require to stop discontinuous operation during line joining.

Line joining in timesharing operation effectively means that one or more configurations including the joining lines are added, while the configurations which do not include any of the joining lines do not change.

The matrix of expected data rates for different configurations, as shown in Eq. (4.10) can be kept in memory for future initialization processes.

Figure 20:
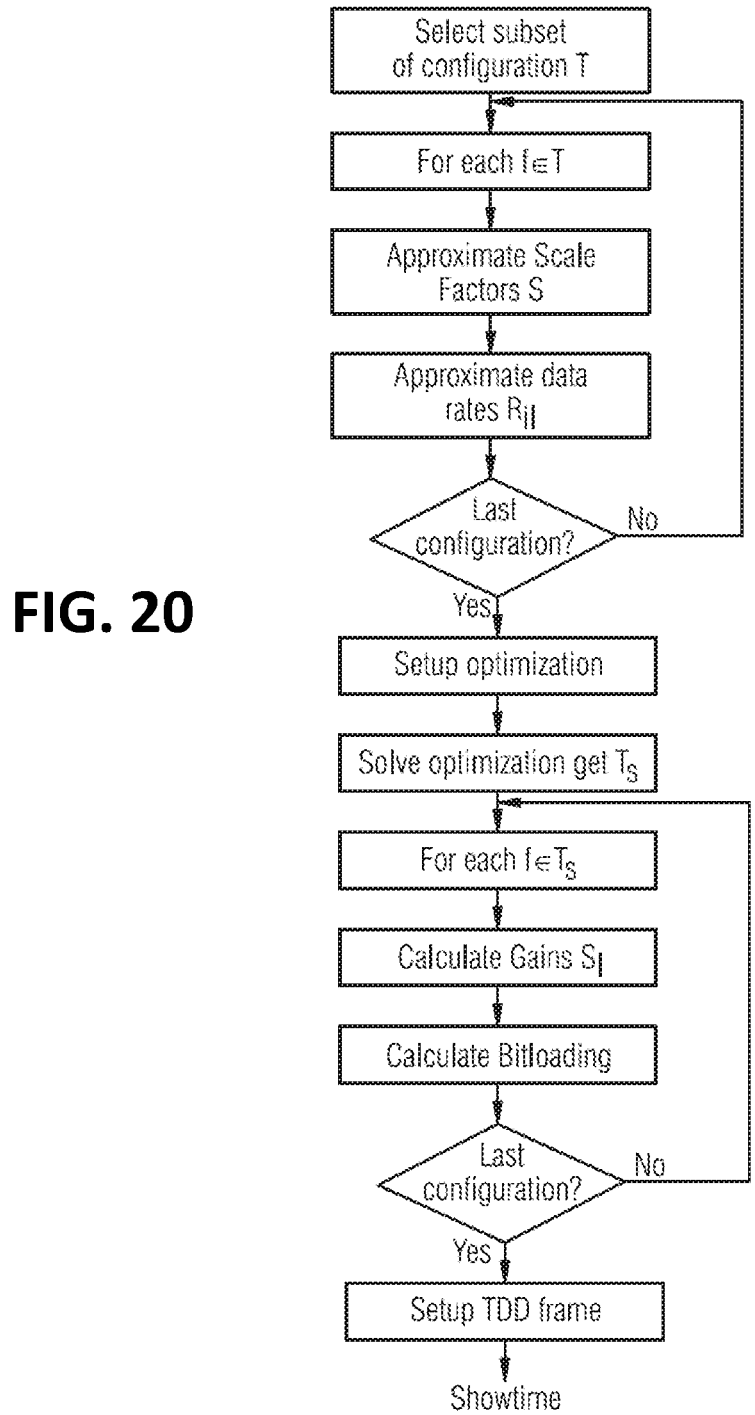
FIG. 20 illustrates a method for line joining according to an embodiment.

The data rates for additional configurations which include the joining line are estimated or approximated and added to the scheduler optimization setup, as shown in FIG. 20 illustrating a method of an embodiment. One method to approximate of rates and scale factors is to use a subset of the subcarriers to optimize PSDs (power spectral densities) and predict the data rates by interpolation between the subcarriers.

For the set of subcarriers contained in the active configuration set $T_a$, the additional scale factors, bit loading and other parameter required to setup data transmission are calculated.

Timesharing as described above may require communication between DP and CPE. This section describes additional communication according to embodiments which may be used to implement timesharing discontinuous operation on a wireline communication system.

While most of the computations for the low power mode are performed only at times when the set of active lines changes, the rate adaptive low power modes as described above may require some computations to be done per TDD frame.

Furthermore, within the TDD frame, the coefficient recalculation as described further below is performed.

The CPE side stores multiple bit loading and gains tables for the set of active configurations $T_a \in T$. For each TDD frame, a medium access plan is communicated to the CPEs which informs them about the points in time where they are allowed to transmit data and points in time where they receive data.

Furthermore, it contains information which bit loading and gains table shall be used. With in one superframe, or even within the TDD frame, the transmission on one line may use different bit loading and gains tables. Each configuration may have an identification number which is also contained in the MAP to identify the configurations to be used.

It must be noted that the CPE stores bit loading and gains tables only for a small part of all configurations $T_a$, because the set of configurations includes some configurations where this specific CPE does not transmit or receive data which do not require storage of bit loading and gains tables at the CPE.

Furthermore, in embodiments online reconfiguration may be used. Each online reconfiguration message contains bit loading and gains table for the subcarriers to be changed. For timesharing, an identifier of the configuration to be changed is added.

Reconfiguration can be requested from the CPE side if the downstream SNR of one of the configurations has changed. It may also be initiated from the DP if the upstream SNR of one of the configurations has changed. If a change of the PSDs of multiple lines is required because of changes in the channel, the precoder coefficients or the SNR of some lines, the online reconfiguration of the downstream may also be initiated by the DP.

During line joining, but also during showtime when the rate requirements change, it might be required to change the set of active configurations $T_a$, corresponding to a configuration replacement. Therefore, an additional reconfiguration method is required which replaces one of the configurations.

It contains the identifier of the configuration to be replaced or added and the bit loading and gains tables of the active subcarriers.

For timesharing, an important information may be the link quality of a base configuration where all lines are active. However, if the system experiences residual crosstalk caused by imperfections in the crosstalk cancellation, the prediction of SNR of other configurations may be different to the actual SNR of the configurations.

Therefore, in embodiments, the DP is able to request SNR of a specific configuration from the CPE.

Some solutions propose approximations for coefficient recalculation to reduce the computational cost. However, approximations result cause some performance degradation compared to the exact solution.

With a system using the minimum configuration, the performance degradation on some configurations will result in a persistent performance degradation regardless of the actual configuration. This in embodiments can be avoided by timesharing.

Linear vector precoding has been implemented on VDSL 2 systems to improve performance for wireline data transmission over crosstalk channels. The main drawback of conventional vectoring DSL systems is the static operation which requires very time-consuming joining and leaving procedures to enable or disable data transmission on a line of the binder. FIG. 8 shows a downstream system model with a linear precoder, which may be described by a precoder matrix P.

u is a vector essentially representing the data to be transmitted, each component of the vector corresponding to one of the channels. S is a matrix indicating for example amplification or gain. P as mentioned is a precoder matrix containing precoder coefficients for vectoring. H is a matrix describing the effects of the channels, including crosstalk between the channels. n represents additive noise. x represents the signals actually transmitted from the transmitter, and y represents a gain at a receiver side. û represents the symbols or data then received.

Coefficient recalculation may be given by $$P_{aa}' = P_{aa} - P_{ad} \cdot P_{dd}^{-1} \cdot P_{da} \quad (5.1)$$

according to the matrix inversion lemma.

Alternatively, the transmit signal x can be recomputed according to $$x_a = P_{aa} u_a - P_{ad} \cdot P_{dd}^{-1} \cdot P_{da} \cdot u_a. \quad (5.2)$$

This requires inversion of the matrix $P_{dd}$ which is high computational effort if many lines have to be disabled and requires memory for the matrix inverse. To overcome both issues, an approximation of the matrix inversion can be used. First order taylor series expansion of the matrix inversion $P_{dd}^{-1} \approx 2I - P_{dd}$ gives an approximation of matrix inversion. Under the assumption that the diagonal elements of the precoder matrix are equal to 1, this leads to $$[P_{dd}^{-1}]_{ii} \approx \begin{cases} -p_{ddij} & \text{for } i \neq i \\ p_{ddij} & \text{for } i = j \end{cases} \quad (5.3)$$

where the original coefficient values can be kept and only the sign changes, which can be incorporated into the calculation.

In upstream direction, linear vector equalization is used instead of linear precoding.

The system model is shown in FIG. 11 which corresponds to $$\hat{u} = G \cdot H \cdot S \cdot u \quad (5.4)$$

G being the matrix containing the equalization coefficients. Similar to the downstream case, coefficient recalculation can be done by $$G_{aa}' = G_{aa} - G_{ad} \cdot G_{dd}^{-1} \cdot G_{da} \quad (5.5)$$

Apart from G, the matrices and vectors of (5.4) correspond to the ones explained above.

Alternatively, the recalculation based on the receive signal according to $$\hat{u}_a = G_{aa} y_a - G_{da} \cdot G_{dd}^{-1} \cdot G_{ad} y_a \quad (5.6)$$

can be implemented.

The approximation by first order taylor series expansion can't be used in upstream, as the precoder is not close to the identity matrix. But the equalizer can be divided into two parts $G = G_{feq} \cdot G_{xt}$, a diagonal equalizer $G_{feq}$ and a off-diagonal equalizer $G_{xt}$, which is close to the identity matrix. The off-diagonal equalizer has diagonal elements equal to one so that the method does not increase complexity $G_{xt} = \text{diag}(H^{-1})^{-1} \cdot H^{-1}$. The diagonal equalizer corresponds to the frequency domain equalizer as it is used in downstream direction $G_{feq} = \text{diag}(G_{xt} \cdot H)^{-1}$.

Eq. (5.7) is only applied to the off-diagonal equalizer.

$$G_{xt\,aa}' = G_{xt\,aa} - G_{xt\,ad} \cdot G_{xt\,dd}^{-1} \cdot G_{xt\,da} \quad (5.7)$$

where the approximation $$[G_{xtdd}^{-1}]_{ij} \approx \begin{cases} -g_{xtddij} & \text{for } i \neq i \\ g_{xtddij} & \text{for } i = j \end{cases} \quad (5.8)$$

can be used for $$G_{xt\,dd}^{-1}.$$

For the recalculation based on transmit signals, $$\hat{u}_a = G_{feqaa} G_{xt\,aa} y_a - G_{xtda} \cdot G_{xt\,dd}^{-1} \cdot G_{xt\,ad} y_a \quad (5.9)$$

is used.

Next, embodiments for transmit spectrum shaping will be discussed. Transmit power in wireline communication is limited by regulation and for technical reasons. To satisfy regulatory constraints and to use the available transmit power as efficient as possible, transmit spectrum shaping is used.

The output spectrum of the linear precoder as well as the nonlinear precoder is different to the input spectrum. To keep the crosstalk cancellation capabilities while changing the transmit spectrum, the transmit spectrum is shaped at the precoder input with the scale matrix S as shown in FIG. 8. The transit covariance matrix $C_{tx}$ is then given by $$C_{tx} = PSS^H P^H, \quad (5.10)$$

where the diagonal elements correspond to the transmit power of the individual ports. In wireline communication, the per-line transmit spectrum is constrained by a spectral mask which is equivalent to a maximum transmit power $p_{max}$ $$c_{tx\,ii} \leq p_{max} \quad (5.11)$$

which in general depends on frequency. This section shows two spectrum shaping approaches for wireline communication with linear precoding in downlink direction.

A simple approach for transmit spectrum scaling is to select the scale factors with respect to the line with the highest gain. Then, the scale factors are given by $$s_{ii} = \sqrt{\frac{p_{max}}{\text{max diag}(PP^H)}}. \quad (5.12)$$

This spectrum scaling method guarantees that the output spectrum complies with the spectral mask on all lines, but only one line will be close to the maximum, while the other lines are scaled lower than that. In general, there is no input transmit spectrum such that all lines can transmit with maximum power. But it is possible to calculate an input spectrum such that the data rates are maximized as shown in the next section.

To improve performance, spectrum optimization can be applied. The data rate $R_l$ of link 1 for linear zero forcing precoding is given by $$R_l = \log_2 \left( 1 + \frac{[H^{-1}]_{ll}^{-1} \cdot |s_l|^2}{\Gamma \sigma_{noise}^2} \right) \quad (5.13)$$

It depends on the channel matrix H, the scale factors S and on the noise variance $\sigma_{noise}^2$.

Equation (5.13) assumes that the SNR is given by $$SNR_l = + \frac{[H^{-1}]_{ll}^{-1} \cdot |s_l|^2}{\sigma_{noise}}^2 \quad (5.14)$$

as a function of the channel matrix H, the receiver noise power $\sigma_{noise}^2$ and the scale matrix S. This holds for a linear zero forcing precoder, where the transmit signal $u_l$ of line 1 before gain scaling has unit power. Furthermore, the precoder matrix P is scaled such that the diagonal elements are equal to 1, according to $$P = H^{-1} \cdot \text{diag}(H^{-1})^{-1} \quad (5.15)$$

The optimization is done with an objective function for all lines, which is here the sum data rate. An additional constraint is introduced to take the limited modulation alphabet into account. There is an upper bound $b_{max}$ and a lower bound $b_{min}$, usually $b_{min} = 1$ for the bit loading b per tone and line. This translates in a maximum required SNR $$SNR_{max} = 2^{b_{max}} - 1 \quad (5.16)$$

and a minimum SNR $$SNR_{min} = 2^{b_{min}} - 1 \quad (5.17)$$

The maximum bit loading and the limit PSD is reformulated in a linear constraint set of the form A·x=b. Instead of maximizing with respect to the gain values $s_i$, the squared gain values $|s_i|^2$ are used as arguments for the optimization problem $$\max_{|s_1|^2 \ldots |s_L|^2} \sum_{l=1}^{L} R_l \text{ s.t. } \begin{array}{l} \sum_{i=1}^{L} |p_{li}|^2 |s_i|^2 \le p_{max} \forall l = 1 \ldots L \\ |s_l|^2 \ge 0 \forall l = 1 \ldots L \\ \frac{|[H^{-1}]_{ll}^{-1}|^2 \cdot |s_l|^2}{\sigma_{noise}^2} \le 2^{b_{max}} - 1 \forall l = 1 \ldots L. \end{array} \quad (5.18)$$

The arguments which solve this optimization problem are the sum-rate optimal scale factors.

The above-described embodiments serve merely as examples and are not to be construed as limiting. In particular, details or numerical values have been given for illustration purposes, but may be different in other implementations.

Example 1 is a method for providing a common bit loading table for multiple customer premises equipment (CPEs) in a network using discontinuous operation for transmitting data in a vector crosstalk cancellation environment, the method comprising the steps of: determining in advance a set of bit loading tables for combinations of lines being in a transmit and quiet mode; and selecting a minimum gain from the plurality of bit loading tables and constructing the common bit loading table from the minimum gains.

Example 2 is the method of example 1, further comprising sending a message to the CPEs that the common bit loading table is required to be formulated.

Example 3 is the method of example 1 or 2, further comprising the step of, during a line joining getting a report of SNR from a CPE side.

Example 4 is the method of any one of examples 1-3, further comprising the step of avoiding influence of crosstalk into SNR measurement.

Example 5 is the method of any one of examples 1-4, further comprising calculating an optimized transmit power spectral density that satisfies spectral mask constraints for all combinations of lines being in a transmit or quiet mode.

Example 6 the method of any one of examples 1-5, wherein determining a set of bit loading tables or constructing the common bit loading table comprises calculating a minimum bit loading of all combinations of lines being in a transmit or quiet mode and assigning bits with respect to a minimum signal to noise ratio.

Example 7 is the method of any one of examples 1-6, further comprising a recalculation of coefficients of a linear precoder and/or a linear equalizer.

Example 8 is the method of any one of examples 1-7, further comprising a downstream transmit spectrum shaping in discontinuous operation.

Example 9 is the method of any one of examples 1-8, further comprising detecting performance critical configuration of lines being in a transmit or quiet mode.

Example 10 is the method of example 9, further comprising excluding critical configurations from constructing the common bit loading table.

Example 11 is the method of example 9, further comprising avoiding a critical configuration by transmitting idle symbols on at least one line being in a quiet mode.

Example 12 is the method of any one of examples 1-11, further comprising precomputing coefficients for different configurations of lines being in a transmit or quiet mode, estimating required gains and determining a minimum gain to satisfy a predetermined spectral mask.

Example 13 is the method of any one of examples 1-12, further comprising predicting rates for different configurations based on a first estimation and an optimization following the estimation.

Example 14 is the method of example 12 or 13, further comprising a line joining.

Example 15 is the method of any one of examples 1-14, further comprising stopping discontinuous operations during a joining process for calculation of an optimized power spectral density.

Example 16 is the method of any one of examples 1-15, further comprising, in case of a joining line, performing a final bit loading in a downstream direction based on signal to noise ratio with a minimum configuration power spectral density and all lines active.

Example 17 is the method of any one of examples 1-16, further comprising performing a signal to noise ratio measurement by detecting an average power error, based on sync symbol and/or based on an orthogonal sequence.

Example 18 is the method of example 17, further comprising using the signal to noise ratio measurement for online reconfiguration in showtime.

Example 19 is a device for providing a common bit loading table for multiple customer premises equipment (CPEs) in a network using discontinuous operation for transmitting data in a vector crosstalk cancellation environment, the device being adapted to: determine in advance a set of bit loading tables for combinations of lines being in a transmit and quiet mode; and select a minimum gain from the plurality of bit loading tables and constructing the common bit loading table from the minimum gains.

Example 20 is the device of example 19, the device being adapted to send a message to the CPEs that the common bit loading table is required to be formulated.

Example 21 is the device of example 19 or 20, the device being adapted to get, during a line joining, a report of SNR from a CPE side.

Example 22 is the device of any one of examples 19-21, the device being adapted to avoid influence of crosstalk into SNR measurement.

Example 23 is the device of any one of examples 19-22, the device being adapted to calculate an optimized transmit power spectral density that satisfies spectral mask constraints for all combinations of lines being in a transmit or quiet mode.

Example 24 is the device of any one of examples 19-23, wherein determining a set of bit loading tables or constructing the common bit loading table comprises calculating a minimum bit loading of all combinations of lines being in a transmit or quiet mode and assigning bits with respect to a minimum signal to noise ratio.

Example 25 is the device of any one of examples 19-24, the device being adapted to recalculate coefficients of a linear precoder and/or a linear equalizer.

Example 26 is the device of any one of examples 19-25, the device being adapted to perform a downstream transmit spectrum shaping in discontinuous operation.

Example 27 is the device of any one of examples 19-26, the device being adapted to detect performance critical configuration of lines being in a transmit or quiet mode.

Example 28 is the device of example 27, the device being adapted to exclude critical configurations from constructing the common bit loading table.

Example 29 is the device of example 27, the device being adapted to avoid a critical configuration by transmitting idle symbols on at least one line being in a quiet mode.

Example 30 is the device of any one of examples 19-29, the device being adapted to precompute coefficients for different configurations of lines being in a transmit or quiet mode, estimate required gains and determine a minimum gain to satisfy a predetermined spectral mask.

Example 31 is the device of any one of examples 19-30, the device being adapted to predict rates for different configurations based on a first estimation and an optimization following the estimation.

Example 32 is the device of example 30 or 31, the device being adapted to perform a line joining.

Example 33 is the device of any one of examples 19-32, the device being adapted to stop discontinuous operations during a joining process for calculation of an optimized power spectral density.

Example 34 is the device of any one of examples 19-33, the device being adapted to, in case of a joining line, perform a final bit loading in a downstream direction based on signal to noise ratio with a minimum configuration power spectral density and all lines active.

Example 35 is the device of any one of examples 19-34, the device being adapted to perform a signal to noise ratio measurement by detecting an average power error, based on sync symbol and/or based on an orthogonal sequence.

Example 36 is the device of example 35, the device being adapted to use the signal to noise ratio measurement for online reconfiguration in showtime.

What is claimed is:

1. A device configured to operate in a discontinuous operation network, the device comprising:
a plurality of transceivers for transmitting data, wherein each transceiver is coupled to one of a plurality of transmission lines and the data is transmitted using vectoring such that the data to be transmitted on a set of transmission lines is jointly processed to reduce crosstalk between the set of transmission lines; and
communication circuitry configured to generate a gain table as part of an initialization, the gain table indicating gains allocated to subcarriers by respective transceivers to transmit data over respective corresponding transmission lines in a transmit mode,
the communication circuitry further configured to generate during the transmit mode a request to change some of the gains of the gain table in a quiet mode in which some of the transceivers are switched off such that corresponding transmission lines discontinue operation.

2. The device of claim 1, further comprising a precoder configured to generate crosstalk coefficients that offset crosstalk in a combination of the transmission lines.

3. The device of claim 1, wherein the communication circuitry is further configured to detect a minimum power consumption for given target data rates over time based on a power per transmission line for a set of specific transmission lines.

4. The device of claim 1, wherein the communication circuitry is configured to select transmission times of at least one configuration of the transmission lines in the transmit mode and the quiet mode to minimize power consumption.

5. The device of claim 1, wherein the communication circuitry is configured to calculate transmit times to adapt to at least one of actual data rates lower than target data rates or peak data rates higher than the target data rates.

6. The device of claim 1, wherein the communication circuitry is configured to increase bit rates of active transmission lines when other lines are in the quiet mode.

7. The device of claim 1, wherein the communication circuitry is configured to maximize data rates for each of a plurality of configurations of the transmission lines to shorten transmit times.

8. The device of claim 1, wherein the communication circuitry is configured to use a timesharing protocol, the timesharing protocol using at least one of a time division duplexing frame update command, a configuration update command or a pair configuration link quality management.

9. The device of claim 1, wherein the communication circuitry is configured to generate the gain table for combinations of the transmission lines being in the transmit mode and the quiet mode.

10. The device of claim 1, wherein the communication circuitry is configured to operate in accordance with a wireline communications protocol.

11. The device of claim 10, wherein the wireline protocol is an xDSL standard including G.fast.

12. The device of claim 1, wherein the communication circuitry is configured to predict data rates for different configurations of a timesharing discontinuous operation of the transmission lines.

13. The device of claim 1, wherein the communication circuitry is configured to use timesharing to separate joining configurations including a joining transmission line to currently active configurations.

14. The device of claim 1, wherein the communication circuitry is configured to generate a bit loading table for a combination of the transmission lines in the transmit mode and the quiet mode.

15. The device of claim 1, wherein the network includes customer premises equipment that is configured to change the gain table according to the request to change some of the gains of the gain table in the quiet mode.

16. The device of claim 1, wherein the device is included in a distribution point and housed in a cabinet.

17. The device of claim 16, wherein the network includes a fiber to the distribution point (FTTdp) that transmits the data from a central office to the device.

18. A method to operate a device in a discontinuous operation network, wherein the device includes a plurality of transceivers for transmitting data, and each transceiver is coupled to one of a plurality of transmission lines and the data is transmitted using vectoring such that the data to be transmitted on a set of transmission lines is jointly processed to reduce crosstalk between the set of transmission lines, the method comprising:
generating a gain table during initialization, the gain table indicating gains allocated to subcarriers by respective transceivers to transmit data over respective corresponding transmission lines in a transmit mode; and
generating during the transmit mode a request to change some of the gains of the gain table in a quiet mode in which some of the transceivers are switched off such that corresponding transmission lines discontinue operation.

19. The method of claim 18, further comprising the step of generating crosstalk coefficients that offset crosstalk in a combination of the transmission lines.

20. The method of claim 18, further comprising the step of detecting a minimum power consumption for given target data rates over time based on a power per transmission line for a set of specific transmission lines.

21. The method of claim 18, further comprising the step of selecting transmission times of at least one configuration of the transmission lines in the transmit mode and the quiet mode to minimize power consumption.

22. The method of claim 18, further comprising the step of calculating transmit times to adapt to at least one of actual data rates lower than target data rates or peak data rates higher than the target data rates.

23. The method of claim 18, further comprising the step of increasing bit rates of active transmission lines when other lines are in the quiet mode.

24. The method of claim 18, further comprising the step of maximizing data rates for each of a plurality of configurations of the transmission lines to shorten transmit times.

25. The method of claim 18, further comprising the step of using a timesharing protocol, the timesharing protocol using at least one of a time division duplexing frame update command, a configuration update command or a pair configuration link quality management.

26. The method of claim 18, further comprising the step of generating the gain table for combinations of the transmission lines being in the transmit mode and the quiet mode.

27. The method of claim 18, further comprising the step of operating the device in accordance with a wireline communications protocol.

28. The device of claim 27, wherein the wireline protocol is an xDSL standard including G.fast.

29. The method of claim 18, further comprising the step of predicting data rates for different configurations of a timesharing discontinuous operation of the transmission lines.

30. The method of claim 18, further comprising the step of using timesharing to separate joining configurations including a joining transmission line to currently active configurations.

31. The method of claim 18, further comprising the step of generating a bit loading table for a combination of the transmission lines in the transmit mode and the quiet mode.

32. The method of claim 18, further comprising the step of updating the gain table of a customer premises equipment according to the request to change some of the gains of the gain table in the quiet mode.

33. The method of claim 18, further comprising the step of transmitting the data from a distribution point housed in a cabinet.

34. The method of claim 33, further comprising the step of transmitting the data from a central office over a fiber to the distribution point (FTTdp) to the device.

* * * * *